US010341565B2

(12) United States Patent
Robinson et al.

(10) Patent No.: US 10,341,565 B2
(45) Date of Patent: Jul. 2, 2019

(54) SELF CORRECTING ADAPTIVE LOW LIGHT OPTICAL PAYLOAD

(71) Applicant: Raytheon Company, Waltham, MA (US)

(72) Inventors: Ian S. Robinson, Redondo Beach, CA (US); John D. Bloomer, Redondo Beach, CA (US)

(73) Assignee: Raytheon Company, Waltham, MA (US)

(*) Notice: Subject to any disclaimer, the term of this patent is extended or adjusted under 35 U.S.C. 154(b) by 433 days.

(21) Appl. No.: 15/151,033

(22) Filed: May 10, 2016

(65) Prior Publication Data

US 2017/0332017 A1    Nov. 16, 2017

(51) Int. Cl.
| | |
|---|---|
| *H04N 5/14* | (2006.01) |
| *H04N 5/33* | (2006.01) |
| *H04N 5/225* | (2006.01) |
| *H04N 5/232* | (2006.01) |
| *H04N 5/235* | (2006.01) |
| *H04N 5/445* | (2011.01) |

(52) U.S. Cl.
CPC ......... *H04N 5/23267* (2013.01); *H04N 5/144* (2013.01); *H04N 5/145* (2013.01); *H04N 5/2258* (2013.01); *H04N 5/2353* (2013.01); *H04N 5/23254* (2013.01); *H04N 5/332* (2013.01); *H04N 5/44504* (2013.01)

(58) Field of Classification Search
CPC combination set(s) only.
See application file for complete search history.

(56) References Cited

U.S. PATENT DOCUMENTS

| | | | |
|---|---|---|---|
| 5,109,435 A | 4/1992 | Lo et al. | |
| 5,991,444 A | 11/1999 | Burt et al. | |
| 6,738,424 B1 | 5/2004 | Allmen et al. | |
| 6,781,127 B1 * | 8/2004 | Wolff | G01J 3/02 250/330 |

(Continued)

FOREIGN PATENT DOCUMENTS

| | | |
|---|---|---|
| CN | 103323028 A | 9/2013 |
| DE | 19615657 A1 | 8/1997 |

(Continued)

OTHER PUBLICATIONS

International Search Report and Written Opinion from related PCT Application No. PCT/US2017/013479 dated Apr. 4, 2017.

(Continued)

*Primary Examiner* — William C Vaughn, Jr.
*Assistant Examiner* — Lindsay J Uhl
(74) *Attorney, Agent, or Firm* — Burns & Levinson, LLP; Joseph M. Maraia

(57) ABSTRACT

Methods and systems are disclosed for compensating for image motion induced by a relative motion between an imaging platform and a scene. During an exposure period, frames of the scene may be captured respectively in multiple spectral bands, where one of the spectral bands has a lower light level than the first spectral band, and contemporaneous frames include a nearly identical induced image motion. Image eigenfunctions are utilized to estimate the induced image motion from the higher SNR spectral band, and compensate in each of the multiple bands.

16 Claims, 25 Drawing Sheets

(56) References Cited

U.S. PATENT DOCUMENTS

| | | |
|---|---|---|
| 7,085,401 B2 | 8/2006 | Averbuch et al. |
| 7,366,325 B2 | 4/2008 | Fujimura et al. |
| 7,440,637 B2 | 10/2008 | Schechner et al. |
| 7,567,731 B2 | 7/2009 | McDowall |
| 7,650,058 B1 | 1/2010 | Garoutte |
| 7,792,520 B2 | 9/2010 | Sohn et al. |
| 7,990,422 B2 | 8/2011 | Ahiska et al. |
| 8,004,570 B2 | 8/2011 | Saito et al. |
| 8,325,799 B2 | 12/2012 | Chono et al. |
| 8,400,619 B1 | 3/2013 | Bachrach et al. |
| 2003/0122862 A1 | 7/2003 | Takaku et al. |
| 2003/0122868 A1 | 7/2003 | Aggarwal et al. |
| 2003/0215141 A1 | 11/2003 | Zakrzewski et al. |
| 2004/0197014 A1 | 10/2004 | Oohashi |
| 2005/0158023 A1 | 7/2005 | Takasu et al. |
| 2005/0162701 A1 | 7/2005 | Hirano |
| 2006/0045311 A1 | 3/2006 | Shibuya |
| 2007/0071296 A1 | 3/2007 | Nonaka et al. |
| 2007/0132856 A1 | 6/2007 | Zakrzewski et al. |
| 2007/0253625 A1 | 11/2007 | Yi |
| 2008/0063355 A1 | 3/2008 | Nakano |
| 2008/0158371 A1 | 7/2008 | Trescott |
| 2008/0273751 A1 | 11/2008 | Yuan et al. |
| 2009/0136023 A1 | 5/2009 | Pan et al. |
| 2010/0014709 A1 | 1/2010 | Wheeler et al. |
| 2010/0073519 A1 | 3/2010 | Onoe et al. |
| 2010/0097444 A1 | 4/2010 | Lablans |
| 2010/0100835 A1 | 4/2010 | Klaric et al. |
| 2010/0265364 A1 | 10/2010 | Robinson et al. |
| 2011/0169960 A1 | 7/2011 | Wagner |
| 2012/0019660 A1 | 1/2012 | Golan et al. |
| 2012/0098933 A1 * | 4/2012 | Robinson ............. H04N 13/221 348/46 |
| 2012/0177121 A1 | 7/2012 | Tripathi et al. |
| 2012/0320237 A1 | 12/2012 | Liu et al. |
| 2014/0118514 A1 * | 5/2014 | Wright ............... H04N 5/23232 348/61 |
| 2015/0051498 A1 * | 2/2015 | Darty .................... A61B 5/447 600/477 |
| 2017/0178399 A1 * | 6/2017 | Fest ........................ G06T 7/004 |

FOREIGN PATENT DOCUMENTS

| | | |
|---|---|---|
| EP | 0917103 A2 | 5/1999 |
| EP | 2445221 A2 | 4/2012 |
| JP | 06078272 | 3/1994 |
| JP | 09200704 | 7/1997 |
| WO | 03058960 | 7/2003 |
| WO | 2008072024 A1 | 6/2008 |
| WO | 2010032058 A1 | 3/2010 |
| WO | 2011100674 A1 | 8/2011 |
| WO | WO 2011100674 A1 * | 8/2011 ............. G03B 17/02 |
| WO | WO-2011100674 A1 * | 8/2011 ............. G03B 17/02 |

OTHER PUBLICATIONS

Anandan et al., "Video as an image data source: efficient representations and applications," Proceedings of the International Conference on Image Processing (ICIP). Washington, Oct. 23-26, 1995; IEEE Comp.Soc. Press, US vol. D 1, pp. 318-321.

Comanducci et al., "2D-to-3D Photo Rendering for 3D Displays," Proc. 5th Int. Symposium on 3D Data Processing, Visualization and Transmission, Paris, May 1, 2010, XP055198218.

Wiegand et al., "Overview of the H.264/AVC Video Coding Standard," IEEE Transactions on Circuits and Systems for Video Technology; Jul. 1, 2003; pp. 560-576; 13(7); IEEE Service Center; Piscataway, NJ, US.

Creech, "NGA Approaches to Wide Area Motion Imagery," National Geospatial-Intelligence Agency; pp. 1-21; (Approved for Public Release 11-146)[AIE Eastern FMV Conference][Feb. 28, 2011-Mar. 2, 2011].

Heller, "From Video to Knowledge," Lawrence Livermore National Laboratory; pp. 4-11 (2011).

Singh, "Performance Analysis for Objective Methods of Video Quality Assessment," 9 pages, [Printed online: Oct. 24, 2010 at http://www.eetimes.com/General/DisplayPrintViewContent?contentltemld=4196911; Published Oct. 18, 2005].

Sullivan, et al., "The H.264/AVC Advanced Video Coding Standard: Overview and Introduction to the Fidelity Range Extensions," SPIE Conference on Applications of Digital Image Processing XXVII, pp. 1-22 (2004).

Nadernejad, E., "Edge Detection Technique: Evaluation and Comparisons" Applied Mathematical Sciences, vol. 2, No. 31, pp. 1507-1520 (2008).

Seitz, S.M. et al, "A Comparison and Evaluation of Multi-View Stereo Reconstr. Algorithms," Proceedings of the 2006 IEEE Computer Soc'y Conf. on Computer Vision and Pattern Recognition, vol. 1, 8 pages (2006).

\* cited by examiner

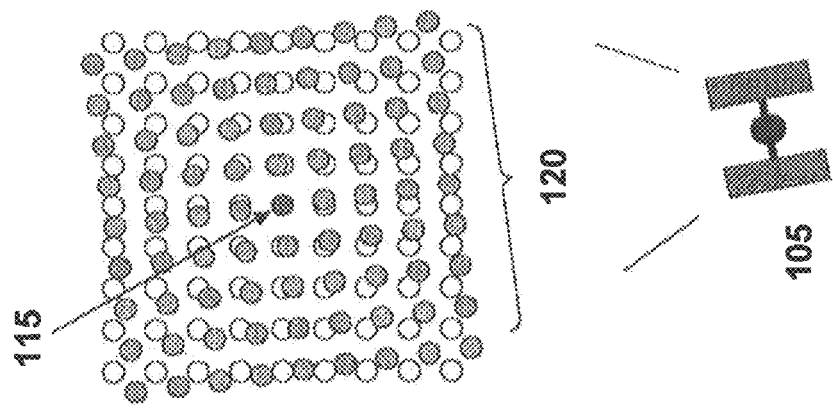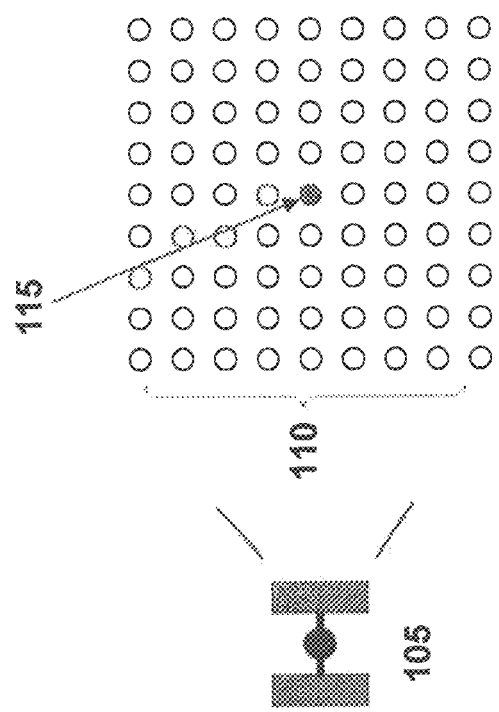

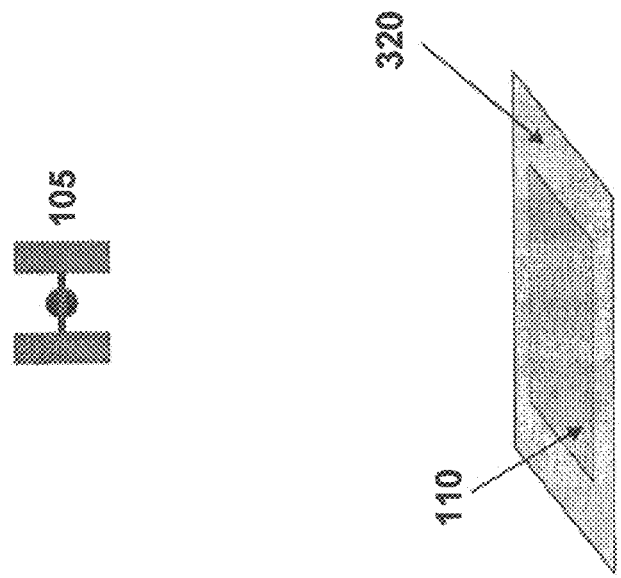
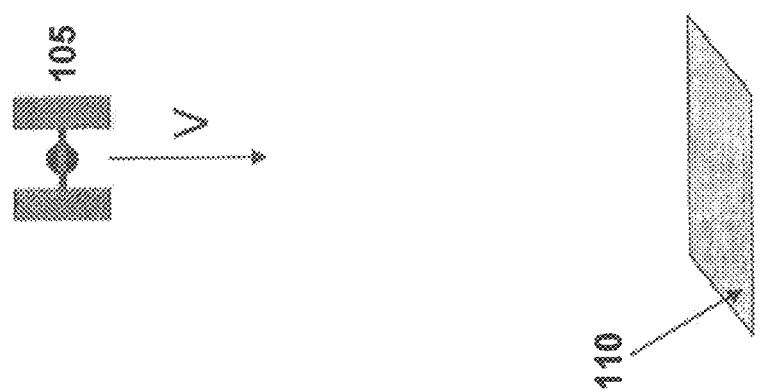

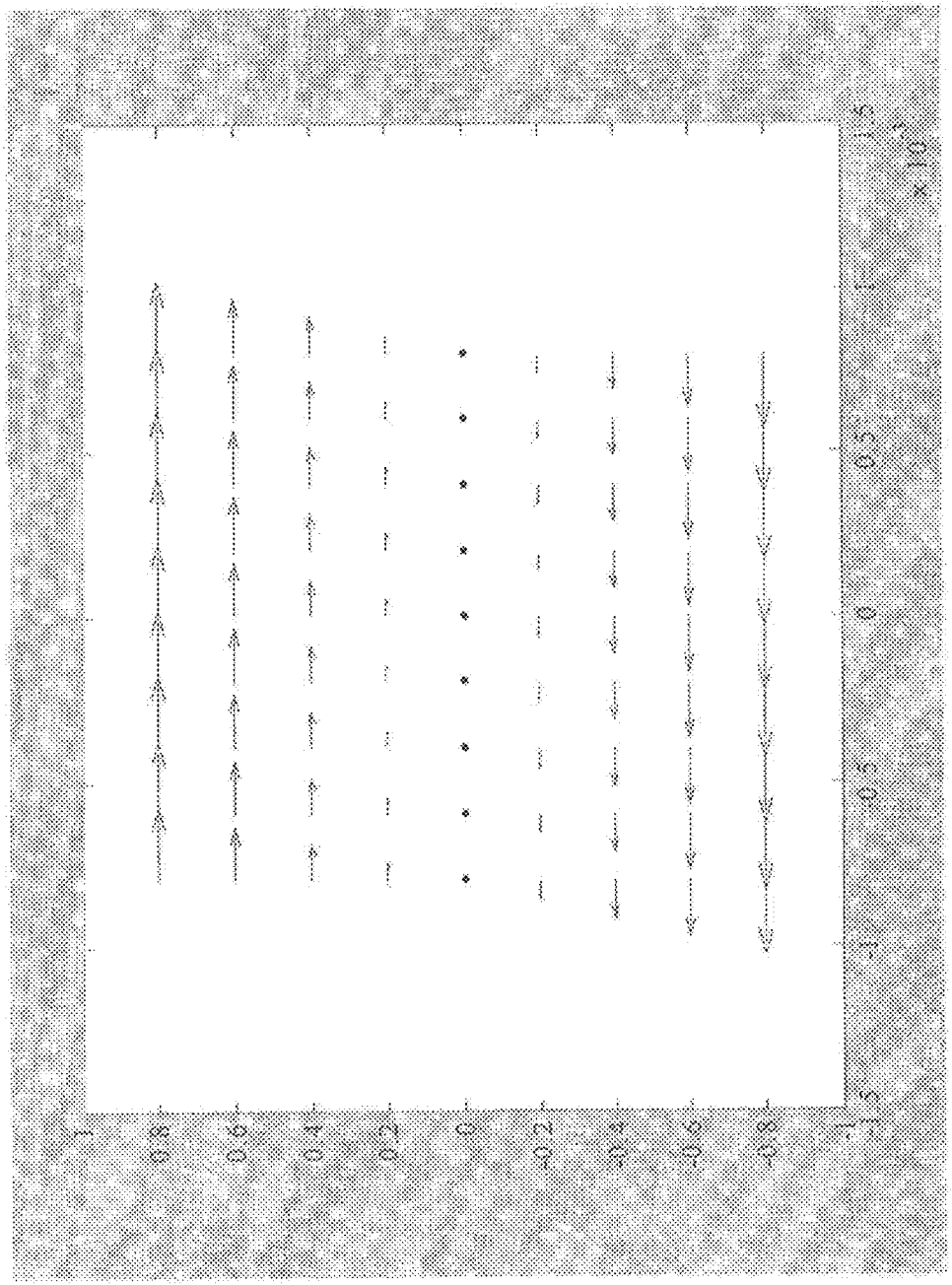

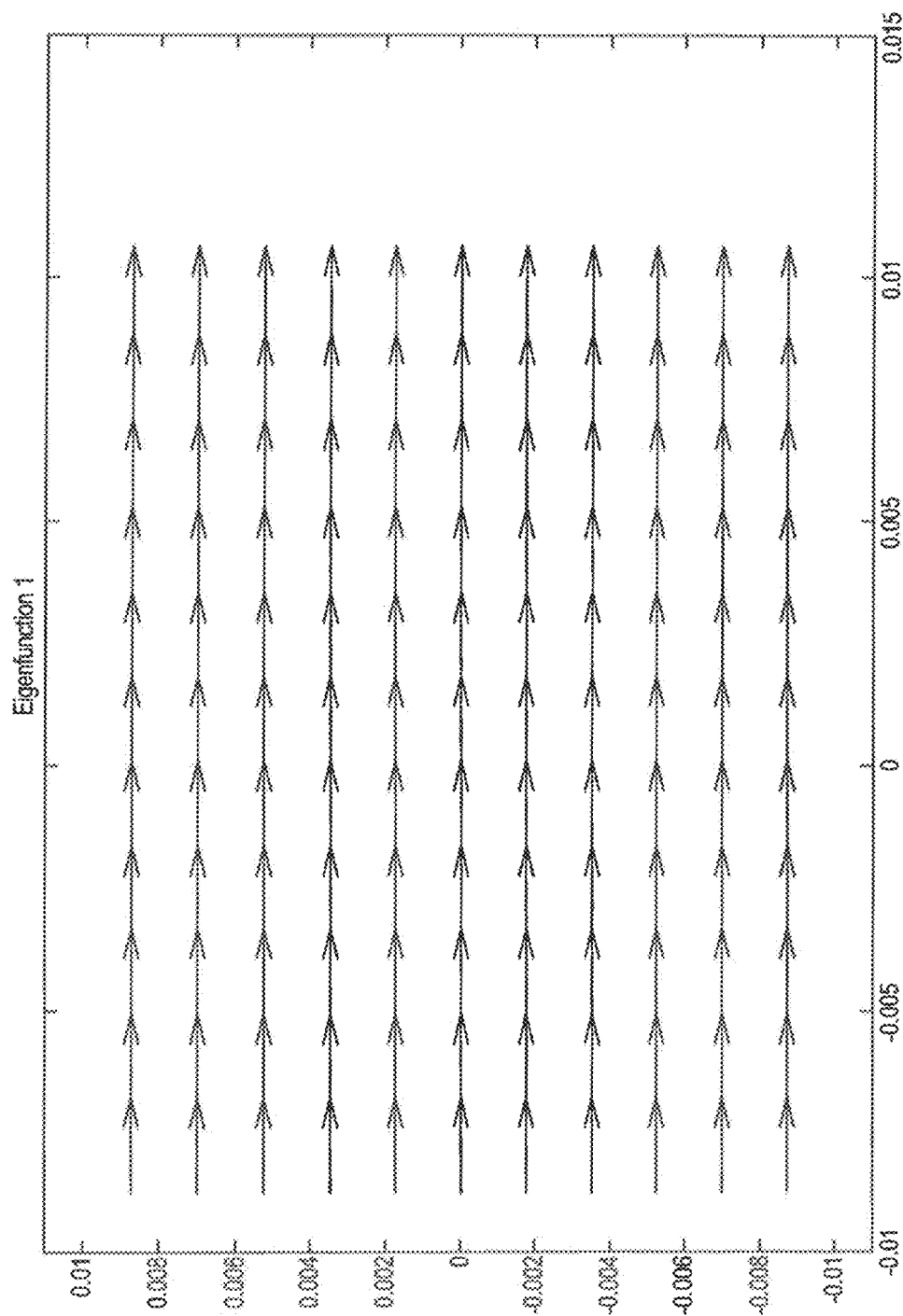

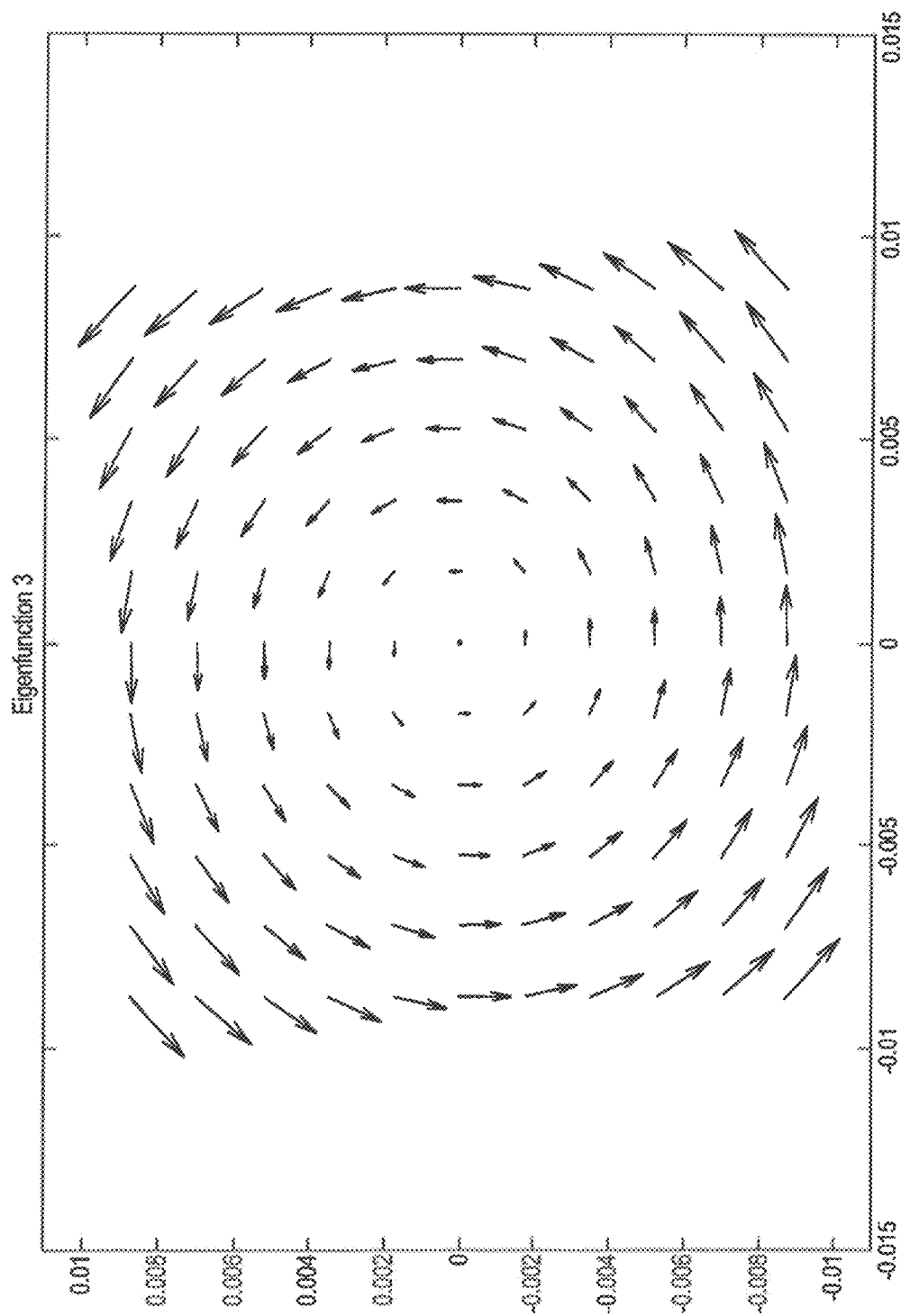

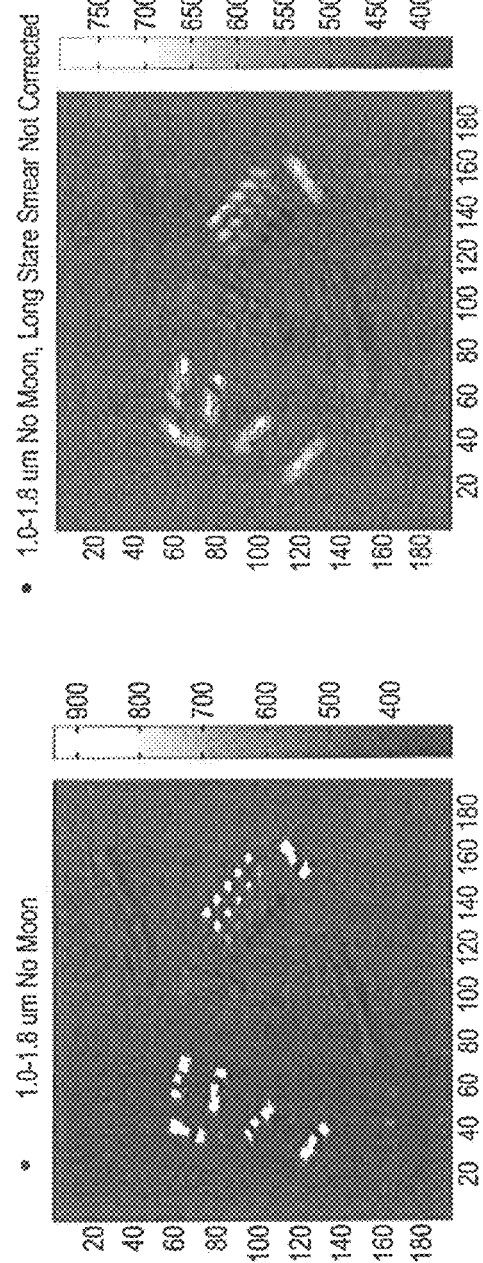
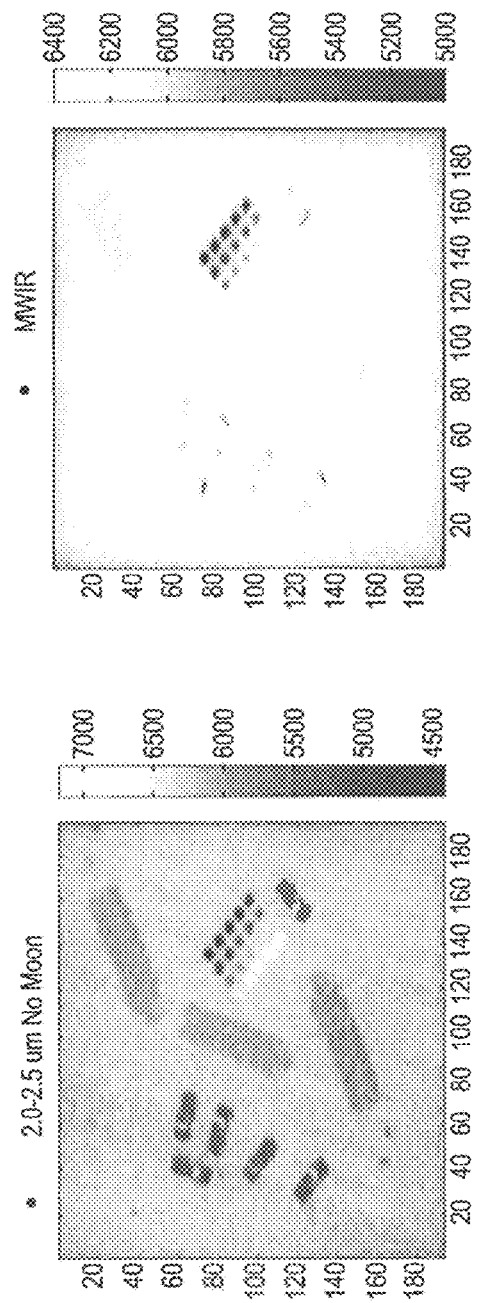
FIG. 15A  FIG. 15B  FIG. 16A  FIG. 16B

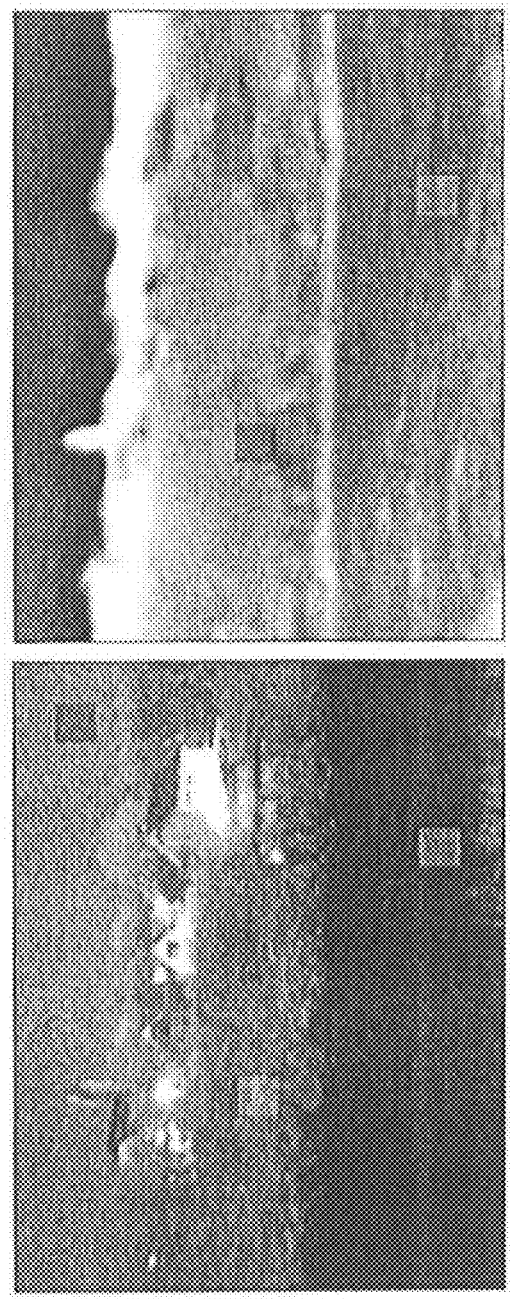

SELF CORRECTING ADAPTIVE LOW LIGHT OPTICAL PAYLOAD

U.S. GOVERNMENT INTEREST

There is no U.S. Government ownership or other interest in the invention(s) described and claimed herein.

BACKGROUND

This application generally relates to image processing, and more particularly, correcting frame-to-frame image changes due to platform motion for persistent observations.

There is a desire to collect persistent video (i.e., multiple image sequences) of a target from overhead platform-based (e.g., airborne or space-based) sensors that can easily be viewed, and/or interpreted, via displays. This may be especially important for military personnel and/or for other persons, using portable devices that may have limited processing capabilities. Conventional persistent video sensors generally stay fixed to (or focus on) a single point, for instance, on the ground, while the overhead platform is in motion. The motion of the platform, however, causes changes in scale, perspective (e.g. parallax), rotation, and/or other changes in viewing geometry. These changes can complicate or prevent human and/or machine interpretation of targets, features, and threats.

U.S. Pat. No. 8,471,915, issued Jun. 25, 2013, entitled "Self-Correcting Adaptive Long-Stare Electro-Optical System" ("SCALES") and herein incorporated by reference in its entirety, discloses a system that is configured to calculate transformations to prevent image intra-frame distortion caused by a relative motion between the scene and the imaging platform and to prevent geometric differences from manifesting as smear within an integration time, thus preventing intra-frame distortion. However, this system relies upon controlling an optical element based on the transformation to prevent the image distortion, and may require more computations for intra-frame motion prevention.

Most nighttime imaging is performed at lower spatial resolution than daylight imaging either because longer wavelengths or fast optical systems are used to collect faint signals. Current short wave infrared (SWIR) staring sensors operate generally at video rates using very fast ~F/1 optical systems. To collect higher resolution imagery with long focal length at a signal to noise ratio that enables interpretation, many frames of lowlight data must be aggregated to provide a high National Imagery Interpretability Rating Scales (NIIRS) image and a multi-spectral image. U.S. Pat. No. 9,294,755, issued Mar. 22, 2016, entitled "Correcting Frame-to-Frame Image Changes Due to Motion for Three Dimensional (3-D) Persistent Observations" (the '755 patent) and herein incorporated by reference in its entirety, demonstrated NIIRS improvement under nighttime low or no light imaging conditions, but required a priori knowledge of platform motion to develop coefficients to apply to eigenfunctions, each eigenfunctions describing a scene-wide transformation. These a priori computed coefficients were applied to multiple frames of imagery to remove induced motion effect. Those image correction methods ignored random errors (e.g., jitter) or errors in the prior knowledge.

An imaging platform having improved image quality thus is desired without the aforementioned drawbacks. For example, an imaging platform is desired which can correct frame-to-frame image changes caused by relative motion between the imaging platform and the scene. Further, an imaging platform is desired which can enhance the quality of captured images in low light applications that are particularly susceptible to inter-frame changes, e.g., imaging platforms having a wide field of view and/or high angular rates of movement with respect to the ground, especially for three-dimensional features in the scene.

BRIEF SUMMARY

According to various embodiments, an imaging platform can correct induced motion, which distorts interpretation, when there is relative motion of the imaging platform with respect to the scene. In particular, airborne and low-orbit space platforms used for ground imaging, for example, tend to be sensitive to motion due to their wide fields of view and/or high angular rates of movement. In addition, nighttime and low-light imaging platforms are susceptible to distortion since longer exposure periods for collecting light are required. By correcting induced motion, the exposure period can be increased to reduce underexposure and loss of contrast without causing blur. Further, an imaging platform can utilize a smaller aperture, thus reducing weight, volume, and cost.

Implementations collect imagery in a relatively high signal to noise ratio (SNR) band to determine platform motion and compute accordant image eigenfunctions coefficients of scene wide changes, and apply those image eigenfunctions, according to the computed coefficients, to correct low light imagery collected with at least one other band that is closely bore-sighted with the high SNR band. Certain implementations assure sample-to-sample registration between the multiple bands through use of multi-band focal plane arrays (FPA). Improved SNR in the lower light level band is then achievable by averaging spatially corrected frames registered to the same grid in object space. Previous use of low light imaging comprises generally stand-alone imagery, and typically is only capable when illumination is sufficient. The low light frame aggregation employed in the implementations has previously not been applied by others in the field, due to the inability to use said imagery to measure the induced motion and extract eigenvector coefficients due to too little SNR per frame to discern features.

In an embodiment, a system is configured to capture images and comprises a movable imaging platform configured with at least one sensor having a focal plane to capture, during an exposure period, frames of a scene in at least two spectral bands, wherein at least one of the spectral bands has a lower light level than another of the spectral bands. Shorter exposure times in the first, higher SNR spectral band may be interleaved with longer exposure times in the lower light level spectral band(s). Using a single focal plane, the frames captured in each of the spectral bands, as noted, are co-registered with the frames captured in the other spectral band(s). The system includes one or more processors configured to calculate one or more transformation coefficients based on measured changes in inter-frame scenes captured in the higher SNR spectral band to compensate for image motion induced by relative motion between the scene and the imaging platform, digitally transform the captured frames with the calculated one or more transformation coefficients, in order to compensate for the platform motion, and sum a plurality of successive compensated frames captured in the lower light spectral band(s) to obtain higher SNR imagery therein.

In another embodiment, a method for capturing images is described, comprising: capturing during an exposure period with at least one sensor on a moving imaging platform frames of a scene in a first spectral band and in at least one other spectral band having a lower light level than the first spectral band, the frames captured in the first and second spectral bands each containing a (virtually or literally) identical image motion component induced by the relative motion between the imaging platform and the scene; calculating one or more eigenfunctions transformation coefficients based on measured changes in inter-frame scenes captured in the first spectral band to compensate for image motion induced by a relative motion between the imaging platform and the scene; digitally transforming the captured frames, the one or more transformations compensating for the image distortion; and summing a plurality of successive compensated frames captured in the lower light level spectral band(s) to obtain higher signal to noise ratio (SNR) imagery therein.

In certain embodiments, the processor(s) is further configured to identify information in the frames captured in the higher light level spectral band that represents one or more moving targets. The identified information may be removed from the frames captured during the exposure period, and optionally added to at least one of the digitally transformed captured frames.

In certain embodiments, ensuring that the frames of the first and second spectral bands capture an identical induced image motion is achieved through use of a multi-band FPA, while in other embodiments a plurality of closely boresighted FPAs are utilized, wherein each FPA in the plurality capturing frames in a distinct spectral band and having a known location relative to the FPA associated with the higher SNR spectral band. In this embodiment, the processor co-registers the frames captured in the higher SNR spectral band with those in the lower light level spectral band(s).

The higher SNR imagery may comprise a high NIIRS nighttime image. The higher light level spectral band may include an emissive band, while the lower light level spectral band may include a reflective band (e.g., SWIR, etc.)

The processor(s) may calculate the one or more image eigenfunction transformation coefficients by comparing successive frame images captured in the first spectral band to compute gradients, and fitting the gradients to one or more image eigenfunctions in order to estimate an induced motion and pointing error. The digital transformation of the captured frames, then, may comprise transforming the captured frames with the image eigenfunctions to the extent indicated by the coefficients, and re-registering the overlapping portions and co-adding the captured frames from images after transformation. The image eigenfunctions may include linear motion, rotation, scale, anamorphic stretch, skew and jitter eigenfunctions.

These and other features and advantages of the system and method will be apparent from this disclosure. It is to be understood that the summary, drawings, and detailed description are not restrictive of the scope of the inventive concept described herein.

BRIEF DESCRIPTION OF THE DRAWING

In the illustrations of the accompanying drawings, like reference characters refer to the same parts throughout the different views. The drawings are not necessarily to scale, emphasis instead being placed upon illustrating the principles of the examples.

FIG. 1A shows an imaging platform and its initial field of view;

FIG. 1B shows changes between the initial field of view and a subsequent field of view;

FIG. 3A shows an imaging platform and its initial field of view;

FIG. 3B shows a change in scale of a subsequent field of view of the imaging platform due to movement of the imaging platform toward the area being imaged;

FIG. 5C shows skew depicted as a vector field;

FIG. 6A shows a vector field of an exemplary eigenfunction transformation comprising an anamorphic stretch in the linear X direction;

FIG. 6C shows a vector field of an exemplary eigenfunction transformation comprising a rotation;

FIGS. 15A-15B show simulated frames of video data of an exemplary scene in a photon poor spectral band at two distinct instances;

FIGS. 16A-16B show simulated frames of video data of an exemplary scene in a photon rich spectral band at two distinct instances;

FIGS. 19A-19D show example SWIR and MWIR images of a scene at two distinct instances, before and after correction in accordance with an embodiment.

DETAILED DESCRIPTION

Figure 2B:
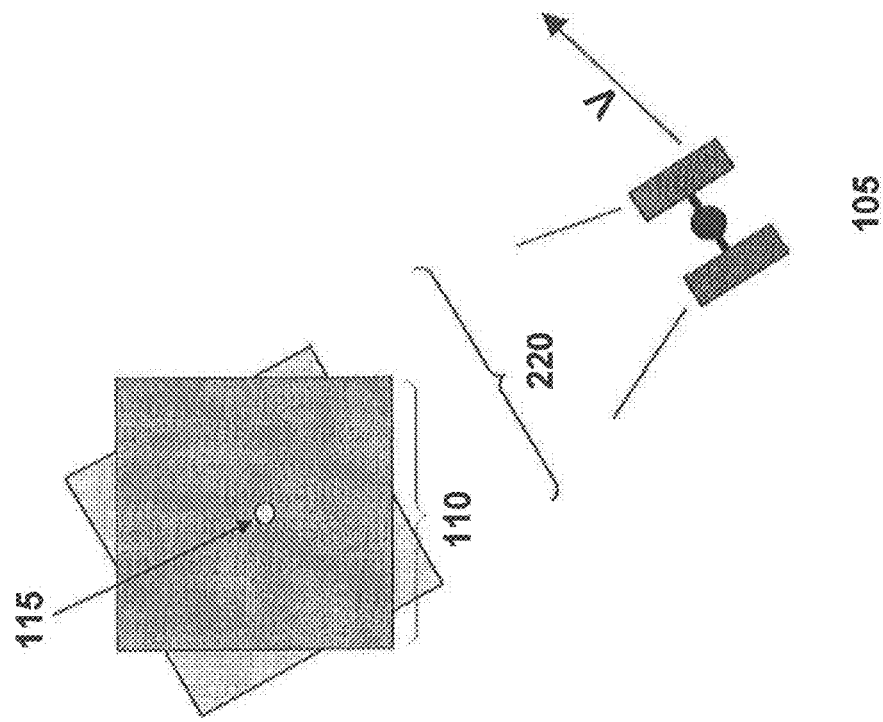
FIG. 2B shows a subsequent field of view due to the movement of the imaging platform between the initial and subsequent imaging time.

Systems and methods for capturing images are disclosed. In the following description, numerous specific details are set forth. In the other instances, details well known to those skilled in the art may not be set out so as not to obscure the invention. It will be apparent to those skilled in the art in the view of this disclosure that modifications, substitutions and/or changes may be made without departing from the scope and spirit of the invention. In the description that follows, like components have been given the same reference numerals, regardless of whether they are shown in different examples. As noted above, in order to illustrate examples of the present disclosure in a clear and concise manner, the drawings may not necessarily be to scale and certain features may be shown in somewhat schematic form. Features that are described and/or illustrated with respect to one example may be used in the same way or in a similar way in one or more other examples and/or in combination with or instead of the features of the other examples.

FIGS. 1-5 illustrate image change problems associated with a moving imaging platform-based sensor. As mentioned above, persistent image and video sensors generally stay fixed to (or stare at, or focus on) a single point being tracked, for instance, on the ground, while the overhead imaging platform is in motion. However, motion of the platform, can cause changes in scale, perspective (e.g. parallax), rotation, and/or other changes in viewing geometry. These changes can complicate or prevent human and/or machine interpretation of targets, features, and threats.

FIG. 1A shows imaging platform 105 (in this case, a satellite), having initial field of view 110, capturing images while gazing at staring point 115. An initial image is sensed at initial detector points (e.g., pixels) (shown as open circles). However, in a subsequent image, the field of view of imaging platform 105 may change due to relative movement between the scene and imaging platform 105.

FIG. 1B shows that due to the motion of imaging platform 105 a subsequent field of view 120 is no longer coextensive with initial field of view 110 in a later image capture. For instance, while it is possible to align (center) staring point 115, the detector points (shown as darkened circles) are shifted with respect to the initial detector points. As a result, an image, or a composite image formed by combining images may be blurred.

Figure 2A:
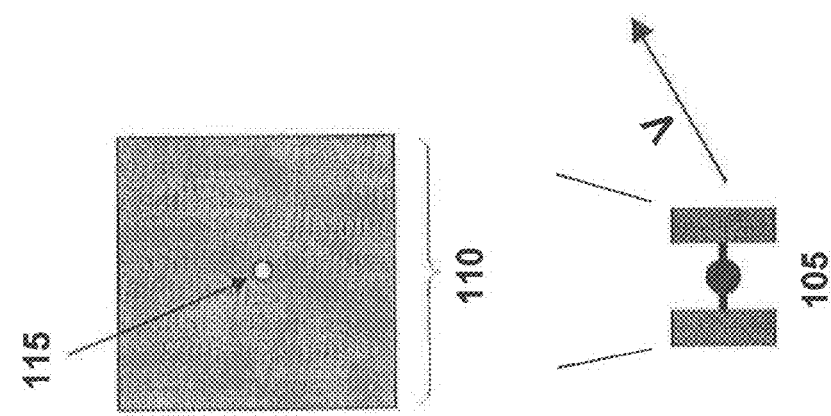
FIG. 2A shows an imaging platform and its initial field of view about a staring point.

FIGS. 2A-5C show examples of physical motions which may cause image change. FIG. 2A, for example, shows initial field of view 110 as imaging platform 105 stares at point 115 while the platform moves at velocity V. FIG. 2B shows a change of subsequent field of view 220 due to the overall motion.

The changes in the size and orientation of the field of view are decomposed into a series of eigenfunctions. FIG. 3A shows initial field of view 110 as the altitude of imaging platform 105 is reduced. FIG. 3B shows a scale change of subsequent field of view 320. In this example, the change in scale is equal in both the horizontal and vertical directions since imaging platform 105 moves directly toward field of view 110. However, in general, the change in scale may be different along each axis. Changes in scale of the field of view also result in changes in the mapping of individual image pixels to the scene.

Figure 4B:
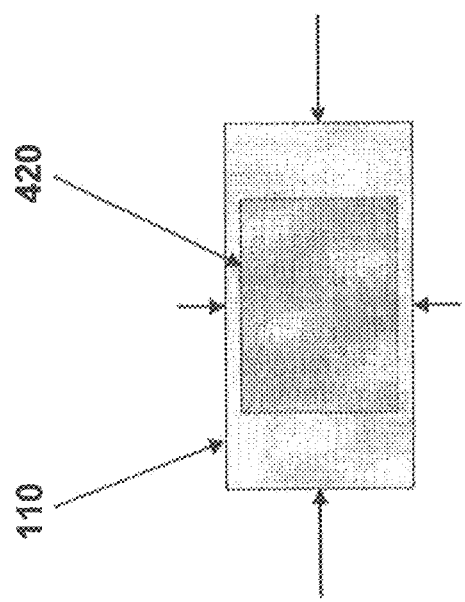
FIG. 4B shows a subsequent field of view scaled in both the X and Y-directions due to the reduction in altitude and zenith angle.
Figure 4A:
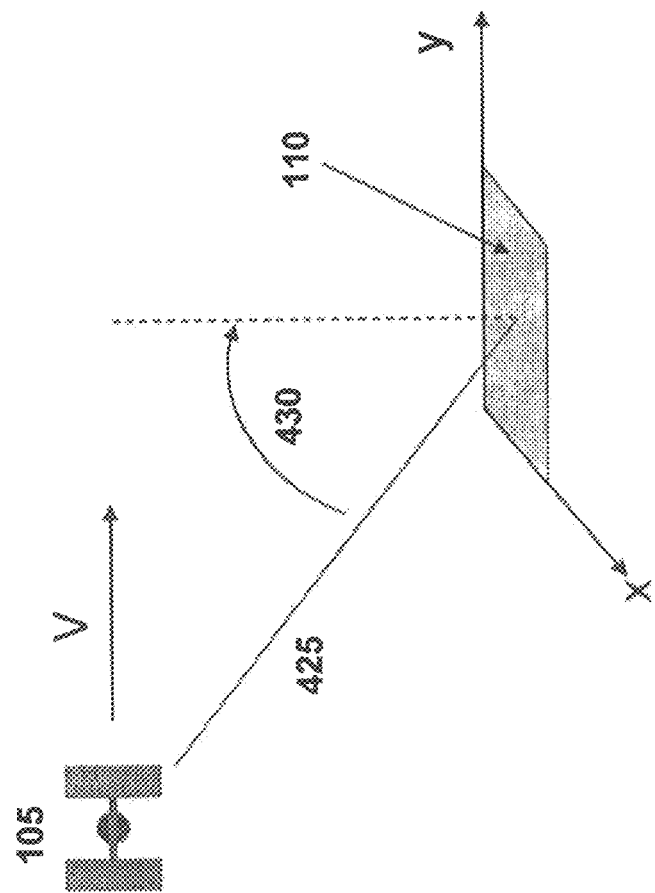
FIG. 4A shows an imaging platform as both its altitude and angle from the zenith is reduced.

FIG. 4A shows imaging platform 105 approaching both the zenith and the area being imaged. FIG. 4B shows an anamorphic scale change of subsequent field of view 420. In particular, subsequent field of view 420 is scaled in both the X and Y directions due to the reduction in altitude of imaging platform 105. Further, subsequent field of view 420 is scaled in the Y-direction more than in the X-direction because line-of-sight 425 remains perpendicular to the X-axis while angle 430 changes with respect to the Y-axis due to the change in zenith angle.

Figure 5B:
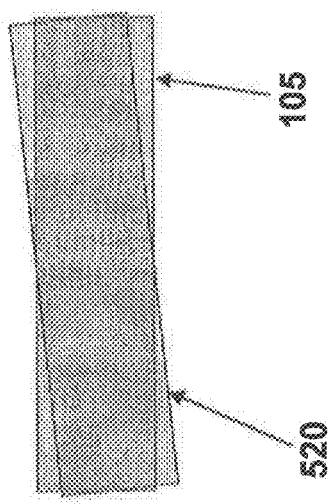
FIG. 5B shows a subsequent field of view due to skew.
Figure 5A:
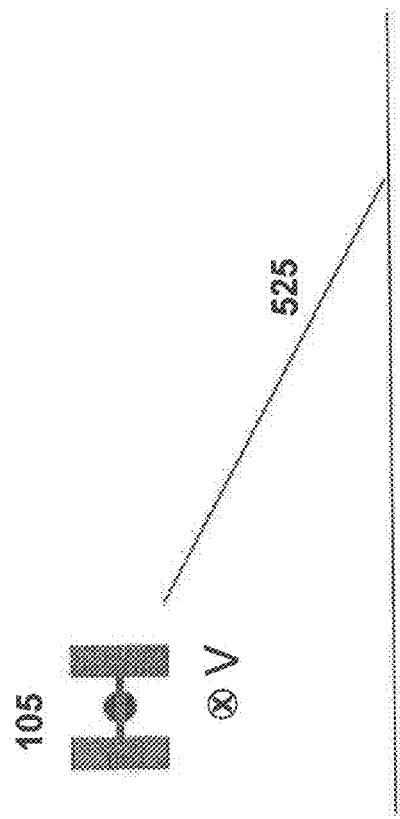
FIG. 5A shows an imaging platform as it approaches the reader in a direction perpendicular to the plane of the page.
Figure 6B:
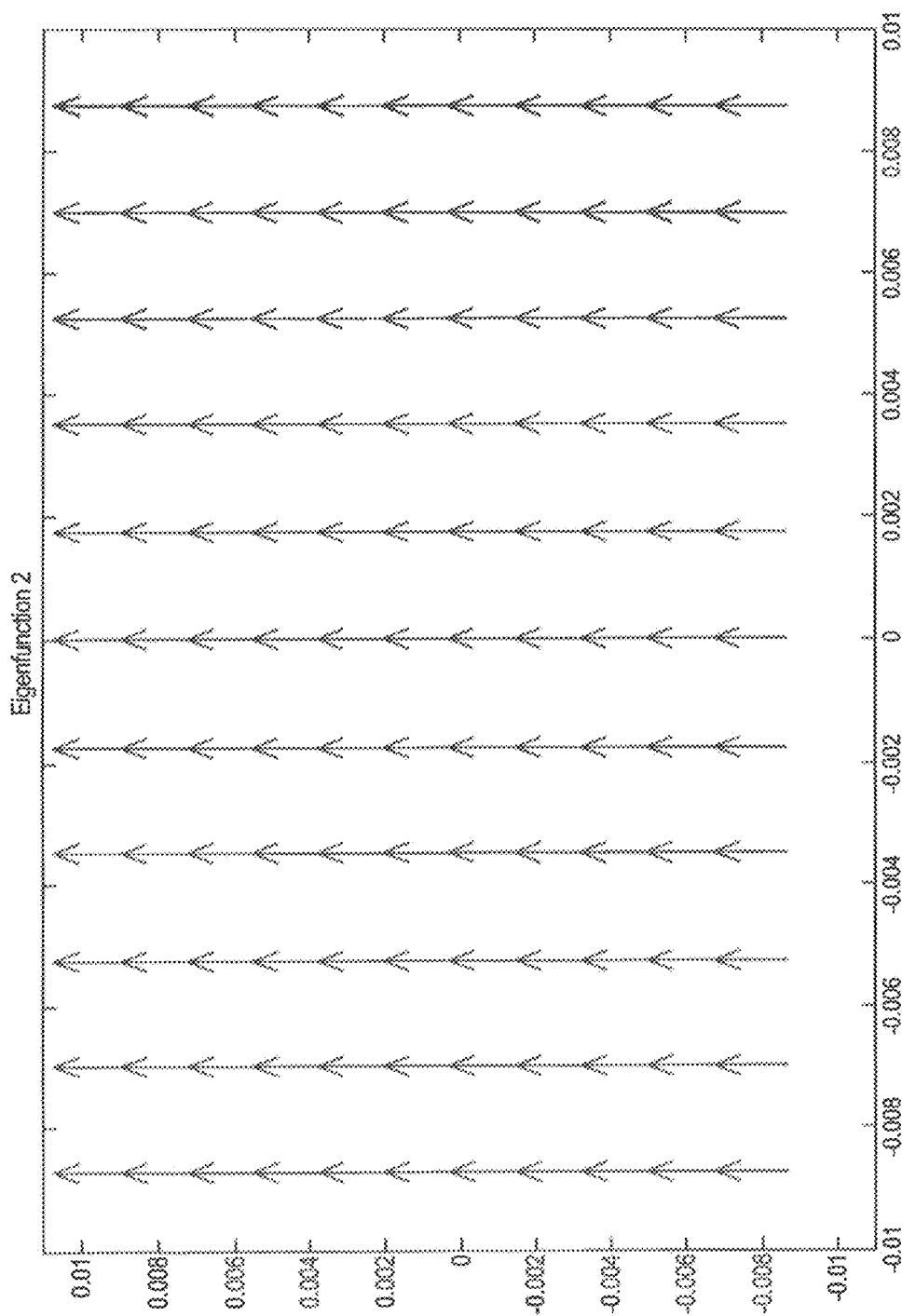
FIG. 6B shows a vector field of an exemplary eigenfunction transformation comprising an anamorphic stretch in the linear Y direction.
Figure 6D:
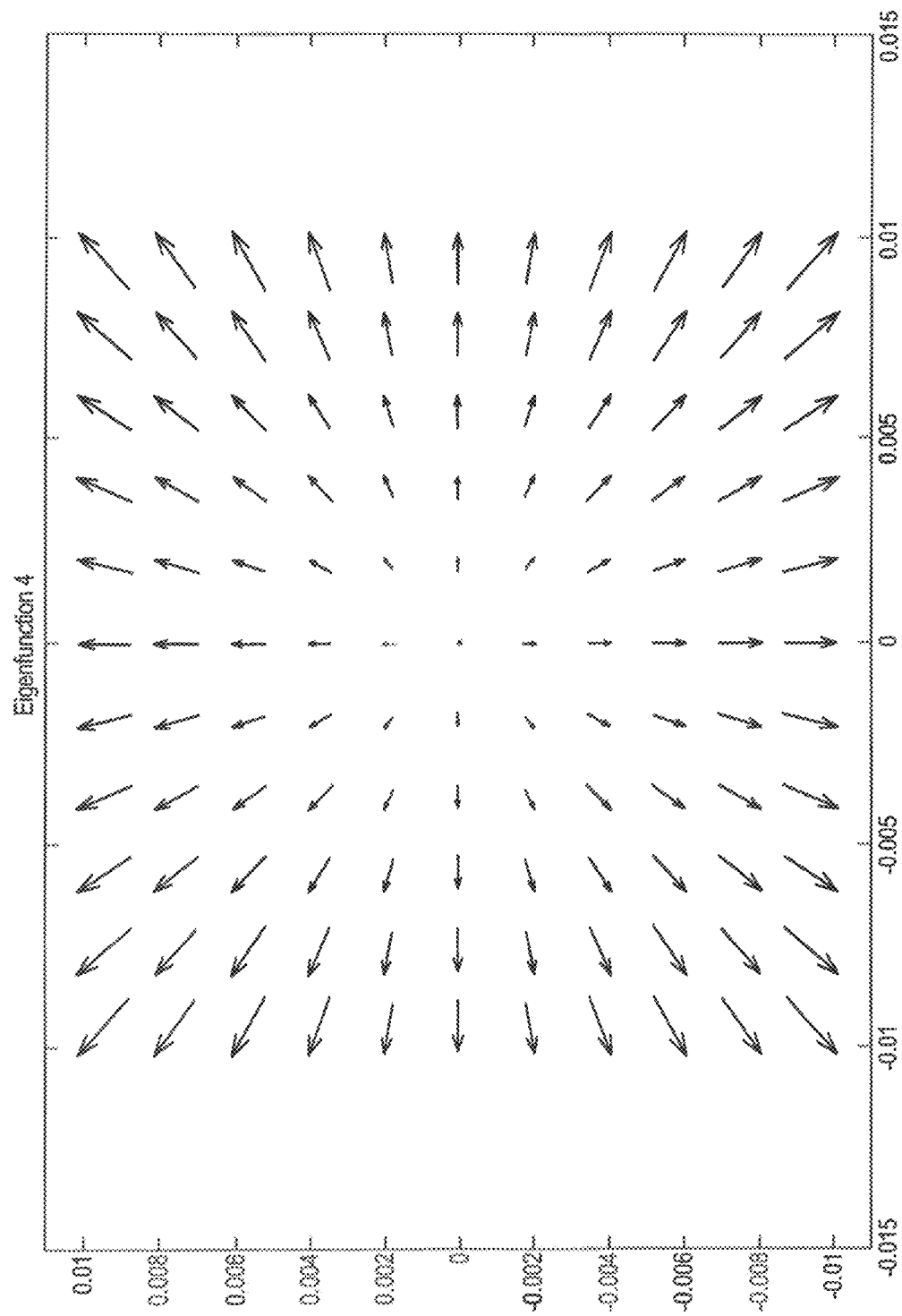
FIG. 6D shows a vector field of an exemplary eigenfunction transformation comprising a change in scale (or focal length)
Figure 6E:
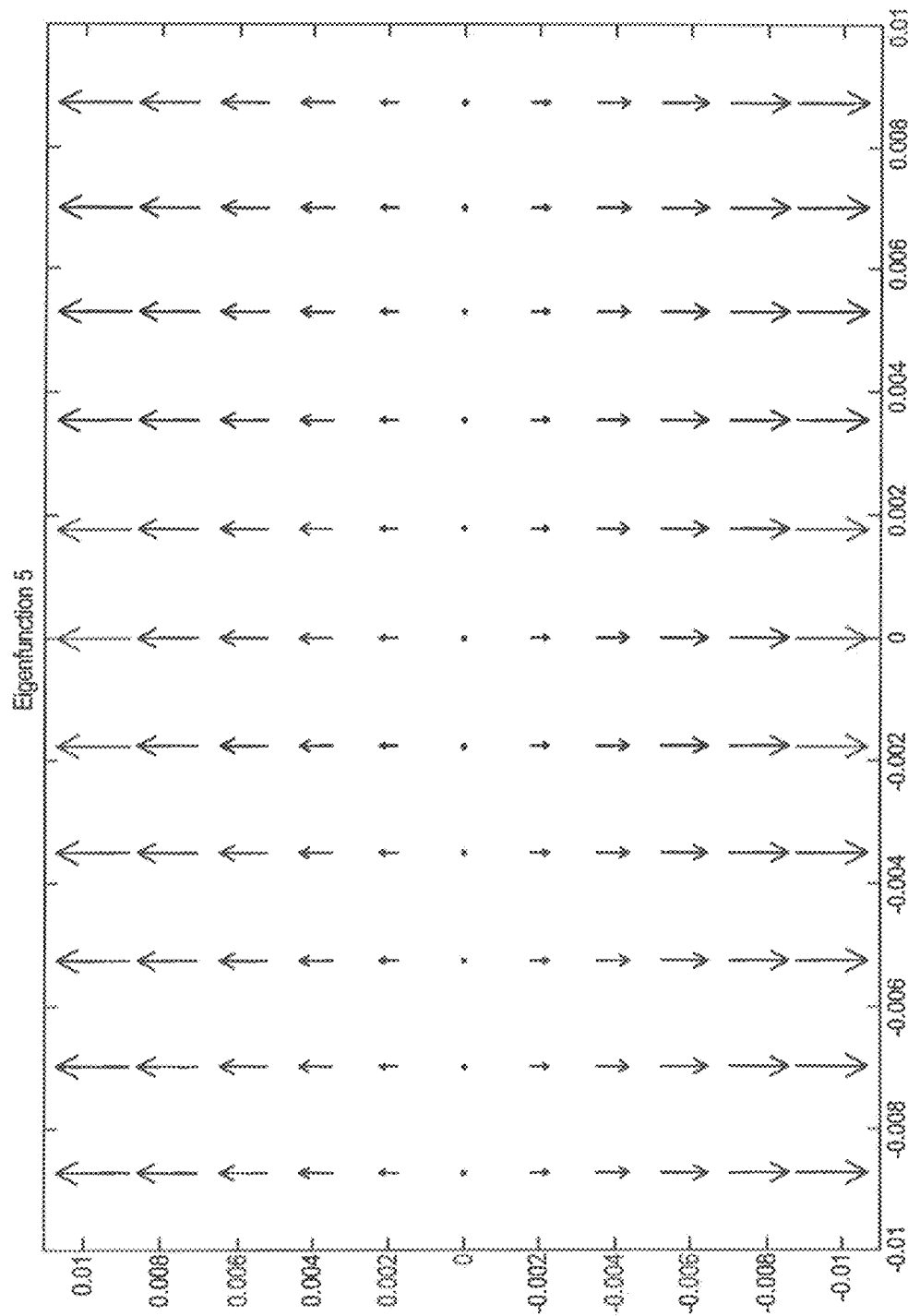
FIG. 6E shows a vector field of an exemplary eigenfunction transformation comprising an anamorphic stretch.
Figure 6F:
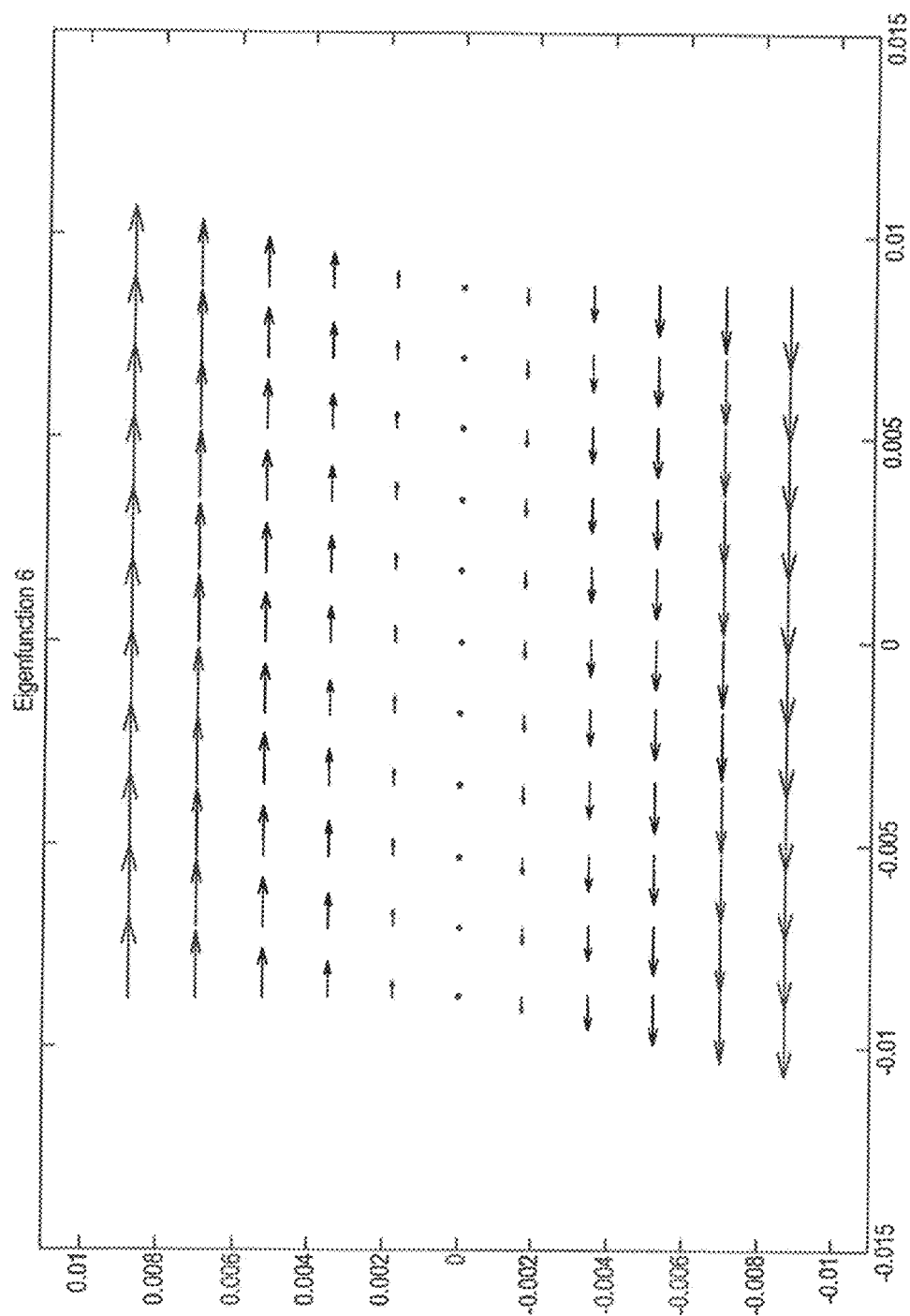
FIG. 6F shows a vector field of an exemplary eigenfunction transformation comprising skew.

FIG. 5A shows imaging platform 105 having line-of-sight 525 moving with velocity V (i.e., approaches the reader in a direction perpendicular to the plane of the page). FIG. 5B shows initial field of view 105 and subsequent field of view 520 caused by skew change. Further, FIG. 5C shows an alternative depiction of skew as a vector field, which also represents one of the eigenfunctions used in the decomposition according to the implementations. The length of the vector corresponds to magnitude of the displacement from the line of site.

These and other detected inter-frame image changes due to movement of the imaging platform-based sensor may be corrected using the imaging system (and method) as described herein, in one or more embodiments, which digitally transforms successive images with respect to a common field of view such that the successive images appear to viewed from the same non-moving platform. The pixel size and orientation of pixels of each transformed image are the same or common.

FIGS. 6A-6F show vector fields associated with six image transforming eigenfunctions for providing the stationary view. In particular, they illustrate anamorphic stretch in the X-direction and the Y-direction, rotation, a scale change in focal length, anamorphic stretch at 45°, and skew, respectively, which may be performed by the imaging system (and method) according to embodiments. In addition there may be transforms for translation in azimuth and elevation, which are not shown.

Exemplary Architecture and Process

Figure 8:
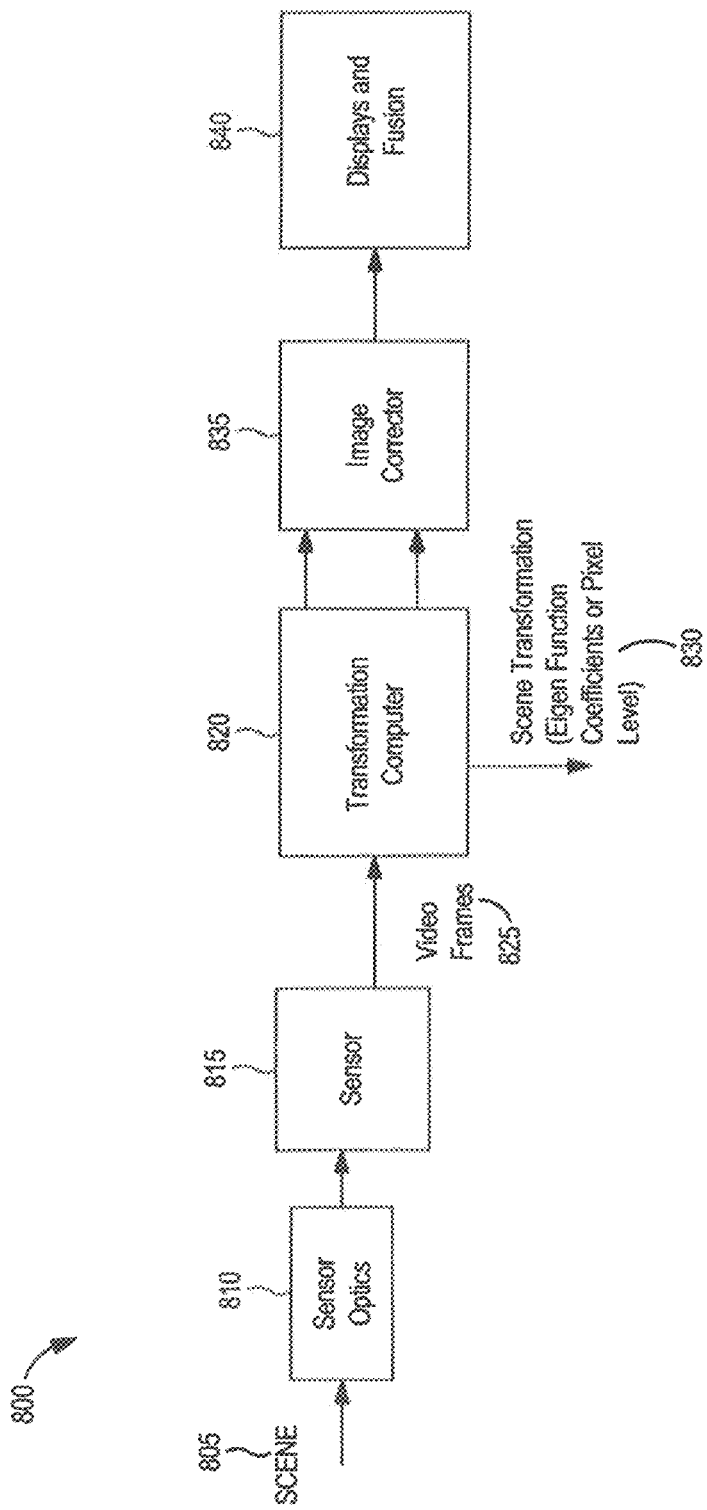
FIG. 8 shows a functional block diagram of an exemplary system for image capture and processing, in accordance with an embodiment.

FIG. 8 shows a schematic of an exemplary moving-platform based imaging system 800 for capturing images (video frames 825) of a scene 805 in multiple spectral bands, and computing in-situ corrections for apparent motion and true object motion using the spectral band having a more photon rich content, according to an embodiment. System 800 may comprise a movable imaging platform configured with sensor optics 810, at least one sensor 815, a transformation computation processor (TCP) 820, an image correction processor 835, and a fusion processor 840.

Figure 9:
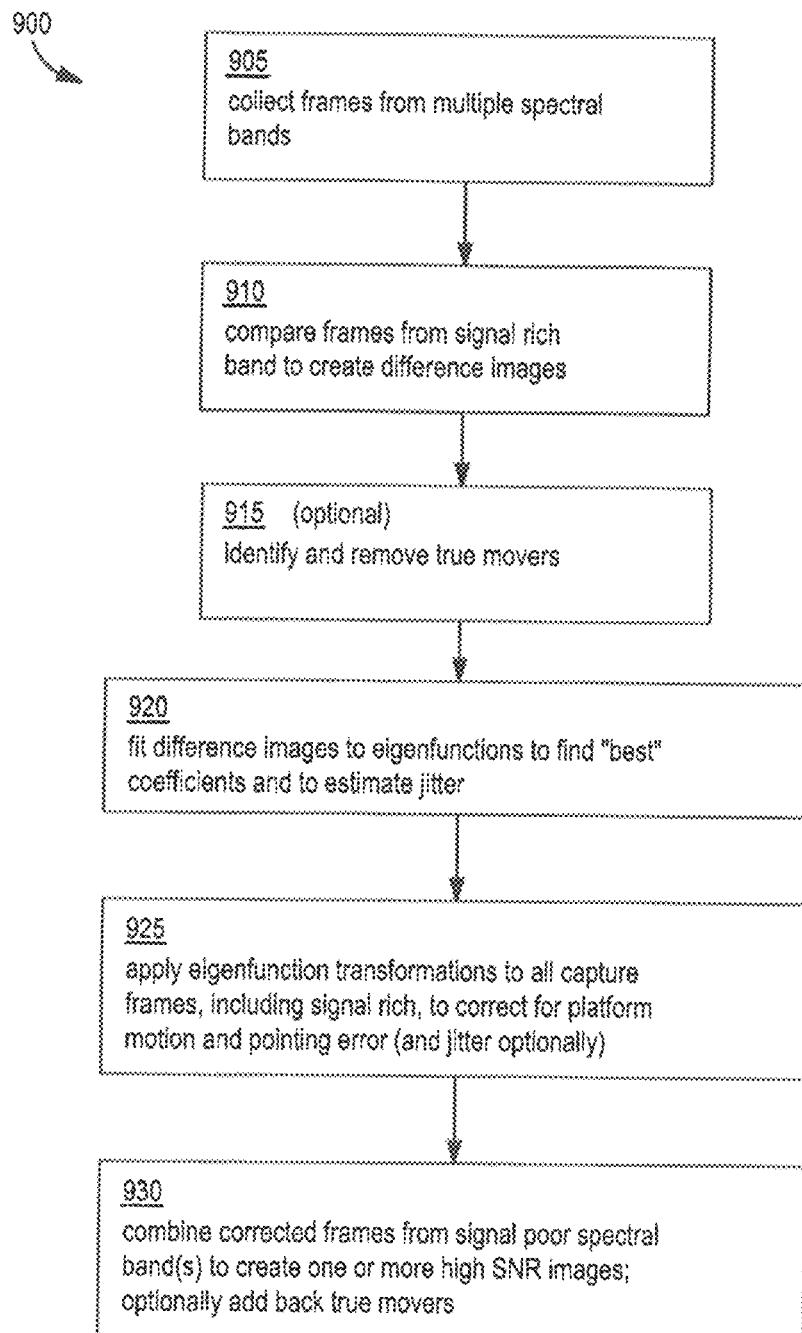
FIG. 9 shows a flow diagram of an exemplary process for image capture and processing, in accordance with an embodiment.

FIG. 9 illustrates a flow diagram of an exemplary process 900 using system 800, according to an embodiment. In step 905, sensor optics 810 and the sensor(s) 815 collect frames 825 of images of scene 805 in a plurality of spectral bands, where one of the spectral bands (e.g., MWIR, LWIR, etc.) has a rich photon (light) level that is higher than the light level of the at least one other spectral band (e.g., SWIR.)

According to one or more embodiments, each image of a ground scene is collected from the moving platform at a moment in time. The image frames 825 may be collected by the sensor 815 at different times or instances. In some instances, these frames 825 may be adjacent or successive image frames, such as in the case for typical video. In others, the frames 825 may be processed at different times but not necessarily in the order collected by the sensor 815. Inter-frame changes for a persistent video collection can be determined or computed for image frame sets (i.e., sequences of images) as well as super-frame sets (i.e., multiple frame sets). As used herein, "inter-frame" refers to aspects between image frames, also referred to as "frame-to-frame."

The images 825 may include, for example, video images and/or multiple intermittent still images, collected by a sensor. In one or more implementation, the sensor 815 may be a camera. The frame rate for video may be, for example, 30 frames per second (fps) or Hz. Although, frame rates can also be higher, such as, for example, 60 fps. Image frames may be digitally data and include a plurality of pixels, whether supporting various colors (e.g., red-green-blue (RGB) or cyan-yellow-magenta-black (CYMK)) or monochrome, and that are of sufficient resolution to permit a viewer to appreciate what is depicted therein. For example, the resolution may be 480 pixels in both width and height, or greater, such as 640×480, 800×800, 1024×768 or 1280×800, for example. Other resolutions (e.g., smaller and larger) are also possible.

System 800 captures one or more images of scene 805 via sensor optics 810, which may comprise multiple reflective mirrors and/or transmissive lens elements. Images of scene 805, as modified by sensor optics 810, are focused onto sensor(s) 815. More particularly, sensor optics 810 receives electromagnetic radiation (light) from scene 805 and focuses the received electromagnetic radiation (light) onto sensor(s) 815. In one implementation, sensor optics 810 may include an objective lens, or other conventional optics, such as one or more mirrors and/or lenses.

Sensor(s) 815 may be mounted on the moving platform, which may be an airborne or space-based imaging platform. Sensor(s) 815 may include any two-dimensional (2-D) sensor configured to detect electromagnetic radiation (light) corresponding to the entering light of interest and generate image frames, whether still or video image. Exemplary electromagnetic radiation detectors may include complementary metal-oxide-semiconductor (CMOS), charge-coupled device (CCD), or other detectors having sufficient spectral response to detect electromagnetic radiation (light) of interest, for example, in the infrared (IR), visible (VIS), and/or ultraviolet (UV) spectra.

Figure 7:
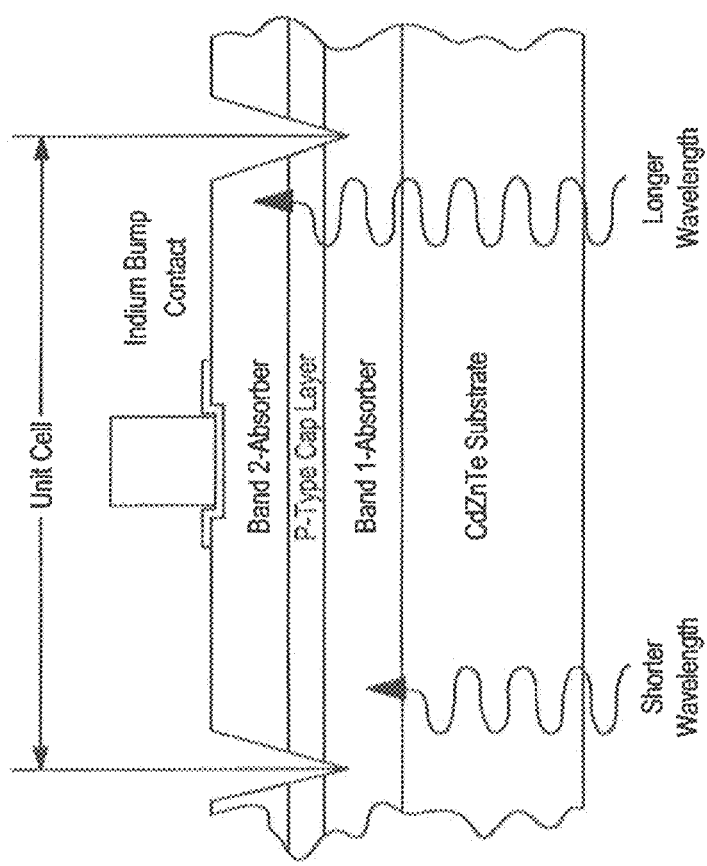
FIG. 7 is a cross-sectional illustration of an exemplary dual-band FPA detector architecture.

In order to achieve nearly perfect image registration, in order to capture a nearly identical induce image motion, in the frames of the multiple spectral bands, the sensor 815 may leverage multi-band FPA technology, where two photosensitive layers are combined and perfectly aligned. For example, Raytheon Vision Systems (RVS, Goleta, Calif.), a subsidiary of Raytheon Company (Waltham, Mass.), has developed high-performance FPA technologies in the 3-5 micrometer MWIR and the 8-12 micrometer LWIR spectral regions by using a variety of semiconductor materials and FPA architectures. Among these technologies, is a dual-band HgCdTe infrared FPA architecture such as shown in cross-section in FIG. 7. The inter-layer distance between the layers has a negligible impact on respective sensing of the scene in the respective spectral bands, such that the induced image motion component captured in the respective frames may be considered identical. The availability of spectral information for a second spectral band enables the discrimination of absolute temperature and unique signatures of objects in the scene. When coupled with the signal processing techniques described herein, multiple color infrared detection provides improved sensitivity compared to that of single-color devices.

Spectral signals acquired by the FPA sensor 815 in multiple spectral bands may be read out using a single set of read-out integrated circuit (ROIC) electronics (e.g., made by RVS, Sofradir). Many short exposure images (e.g., 1 to 100 ms) of the scene 805 may be taken by the FPA sensor 815. The exposures are selected to be sufficiently short that the platform motion within one exposure period (or image) is expected to be relatively small. Successive frames 825 are then manipulated or transformed to have the appearance of being viewed by a stationary viewer. Very short exposures (e.g., milliseconds) in the photon rich spectral band may be interleaved with longer exposures (10 s of milliseconds) of photon poor band(s) (e.g., 1.0-1.8) using long focal length (e.g. diffraction limited) optics to obtain nearly perfectly registered imagery in multiple bands with good SNR. Use of a single FPA sensor 815, thus, allows the time of collection to be shared, e.g., 95-99% of the exposure time for the photon poor spectral band(s) and 1-5% for the photon rich spectral band(s).

The photon rich (e.g., MWIR, LWIR, etc.) spectral band may provide high SNR, thermal imagery that is used to determine all motion of the spectral collection system. Each frame 825 of the photon poor (e.g., SWIR Visible/NIR, and/or thermal SWIR, etc.) spectral band contains reflective (i.e., airglow, moonlight, manmade light, etc.) at poor SNR. The motion measured by the photon rich band is used to develop the transforms to be applied to the photon-poor imagery to remove platform motion effects. Time averaging (i.e., summing) of the transformed reflective spectral band imagery results in high NIIRS reflective images, which can be fused with the thermal imagery to enhance object recognition.

It will be appreciated that a multi-band FPA sensor 815 is preferred for efficiency and co-registration, but use of two or more separate FPAs to acquire images in spectral bands of differing photon richness is permissible. In such an embodiment, the FPAs would preferably be closely-boresighted in fixed spatial relationship, such that frames 825 captured in the distinct FPAs can be consistently registered. This may be performed by applying an image transformation to either or both frames that has been predetermined to co-register the frames based on the fixed, known relative spacing of the FPAs on the platform. The moving-platform imaging system 800 may include a separate registration processor configured to co-register the frames captured 825 in the first spectral band and the second spectral band, or this function could be performed by TCP 820.

It will be further appreciated that the sensor need not be trained on any particular location in the scene. Rather, the transformations may provide a scene that appears to be taken from a non-moving platform (with exception of actual moving objects and objects with height above the ground plane). Moving objects may be more readily detected by an observer since the background is approximately stationary. 3-D features having a height exhibit a slight "leaning" motion through the scene along predictable paths. The rate of movement is directly proportional to the height of the object.

TCP 820 is configured to receive image frames from sensor(s) 815 and to perform image processing, as discussed herein. TCP 820 may include hardware, such as Application Specific Integrated Circuits (ASICs), Field Programmable Gate Arrays (FPGAs), digital signal processors (DSPs), or other integrated formats. However, those skilled in the art will recognize that TCP 820 may, in whole or in part, be equivalently implemented in integrated circuits, as one or more computer programs having computer-executable instructions or code running on one or more computers (e.g., as one or more programs running on one or more computer systems), as one or more programs running on one or more processors (e.g., as one or more programs running on one or more microprocessors), as firmware, or as any combination thereof, and that designing the circuitry and/or writing the code for the software and/or firmware would be well within the skill of one skilled in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of computer-readable medium used to carry out the distribution.

In some embodiments, TCP 820 may be located directly on the imaging platform and/or with sensor(s) 815. As such, the transformed imagery can be directly transmitted to users without the need for any additional image processing. However, this need not be the case. Thus, in some embodiments (as shown), image TCP 820 may be separate from the imaging platform. For instance, TCP 820 may be ground-based (such as, at a command center). In other instance, TCP 820 may be vehicle-based, such as, for example, in an automobile, tank, helicopter, airplane, ship, submarine, or the like. Sensor 815 and TCP 820 may communicate and/or share information and data, preferably, in "real-time," via one or more connections and/or networks there between. Sensor 815 may transmit image frames, trajectory information, sensor viewing information to TCP 820 by any means (including, for instance, radio, microwave, or other electromagnetic radiation means, optical, electrical, wired or wireless transmissions or the like). In addition, networked communication over one or more digital networks, such as intranets and Internet are possible.

TCP 820 is further configured to determine the nature and degree of change between different images collected by sensor(s) 815, and to apply one or more transformation functions that mathematically describe the inter-frame change. In one embodiment, the transformation may be eigenfunction transformations. TCP 820, in step 910, compares successive frames 825 of scene 805 captured in the signal rich spectral band to create difference or gradient images. TCP 820 may, prior to comparing successive frames, co-register the frames captured during the exposure period in the distinct spectral bands, based on the fixed, known spatial relationship between or among the sensors 815. In step 915, TCP optionally identifies information contained in the frames 825 captured in the signal rich spectral band that represents moving targets ("true movers") in the scene 805, and removes the identified information. Such true mover motion can enhance resolution in the signal rich band.

In step 920, TCP 820 fits the scene-wide difference or gradient images to the eigenfunctions (described above and shown in FIGS. 5C, 6A-6F) to determine the appropriate one or more transformation(s) and a corresponding optimal set of eigenfunctions coefficients for compensating for image motion induced by relative motion between the scene and the imaging platform. Transform modeling may be performed to find "best-fit" coefficients for each eigenfunction for the one or more eigenfunction transformations. The transformations may be optimized by calculating "best fits" or coefficients to minimize mean-square error (MSE) or the maximum error, for example. After calculating best fits, the modeled eigenfunction transformations for correcting the induced image motion are output to image correction processor 835 so as to digitally transform images.

Those of skill in the art of image processing will readily appreciate that the estimation of scene transformation(s) 830, including the required eigenfunction transformations and associated coefficients for estimating and correcting the induced image motion, using scene-wide changes as described herein could be performed with alternative techniques, such as by using sub-frame groups of pixels, however, such approaches would likely be computationally more burdensome.

Image correction processor 835 receives the scene transformations 830 (i.e., appropriate eigenfunction transformations and coefficients) from TCP 820 and digitally transforms the image frames 825 of all of the spectral bands, such that the image frames 825 from sensor 815 appear as viewed from the same fixed or non-moving imaging platform. In particular, image correction processor 835 may be configured to digitally transform successive images of the scene 805 with respect to a common field of view (FOV) such that the successive images appear to be viewed from the same non-moving platform. For example, the eigenfunction transformations may comprise, as described above, rotation, zoom, anamorphic stretch in azimuth (or X-axis of the focal plane assembly), anamorphic stretch at 45° (from X-axis), anamorphic stretch in elevation (Y-axis), and/or anamorphic stretch at −45° (from X-axis).

Image correction processor 835, in step 925, applies the scene transformations 830 to all captured frames 825 in each spectral band employed, in order to digitally transform the captured frames 825 to compensate for platform motion and pointing error (and optionally jitter.) There will be very small apparent motion due to parallax for objects above or below, in essence, the frozen plane from which the eigenfunctions transforms are computed.

Fusion processor 840 is configured to enhance the resolution of images 825 captured in the signal poor spectral band. Fusion processor 840, in step 930, then re-registers and sums pluralities of successive compensated frames captured in the one or more spectral bands having lesser light level(s) in order to obtain high SNR imagery in said spectral band(s). If "true mover" information had previously been identified and removed from the captured frames 825, such information may be added back into the compensated captured frames. The transformations developed permit corrections in band(s) that are signal poor, enabling multi-spectral collection of diffraction limited imagery at night under any illumination, including no illumination at all. In some instances, the enhanced images may enable a high "rating" according to the National Imagery Interpretability Rating Scale (NIIRS).

Video sequences of the transformed imagery may be displayed, in which static, moving, and/or 3-D objects may be identified (e.g., highlighted, color-coded, annotated, etc.) in the displayed image(s) of the scene. As such, human and machine interpretation is greatly facilitated. No additional digital image processing may be required once the images are transformed, in many instances.

Alternate Implementations

In an alternate implementation, TCP 820 may also employ one or more of the prediction techniques that rely on a priori knowledge of platform motion information as described in the '755 patent previously cited and incorporated by reference in its entirety. In such an implementation, the techniques described therein may optionally be first applied to the photon rich MWIR band imagery. This could remove known trajectory and sensor pointing motion effects from all imagery. Then the embodiments described herein may be applied to the imagery resulting from the a priori technique, so that the techniques described herein compute only residual errors in the a priori results.

In another alternate implementation, system 800 and method 900 may provide enhanced resolution (e.g., super-resolution) imagery that can also be selected for display. Enhanced 2-D displays of the imagery may be further provided, for example, by applying a super-resolution technique to aggregates of transformed scenes. Moreover, 3-D displays of the imagery may be provided via stereo displays. This may require little, if any, additional processing. Video sequences of the image frames may be displayed, in which static, moving, and 3-D objects may be identified (e.g., highlighted) in the scene. As such, human and machine interpretation is greatly facilitated. No additional digital image processing may be required in many instances.

The eigenfunction transformations computed, as described above, from inter-frame scene changes, may be applied to future captured frames, as an initial image processing step. In other implementations, the transformations may be fed back to adjust collecting optics 810 to minimize motion induced errors.

One or more users can interface with system 800. Users typically will be located remotely from imaging platform and/or image processors 820 and 835, for instance. Of course, users may also be located on the imaging platform, and/or a location near system 800. In one or more implementations, users can communicated with, and/or share information and data with system 800 by any means (including, for instance, radio, microwave, or other electromagnetic radiation means, optical, electrical, wired, and wireless transmissions or the like). In addition, networked communication over one or more digital networks, such as intranets and Internet are possible. Any suitable user display may be used, including, for instance, any display device configured for displayed video and/or image frames. Televisions, computer monitors, laptops, tablets computing device, smart phones, personal digital assistant (PDAs) and/or other displays and computing devices may be used. Exemplary display devices may include a cathode ray tube (CRT), plasma, liquid crystal display (LCD), light or emitting diode (LED) display, for example.

Exemplary Images

FIGS. 10-14 show an example of correcting frame-to-frame image change due to motion of an imaging platform relative to the ground. In this example, four eigenfunction transformations (i.e., rotation, zoom, anamorphic stretch in x-axis, and anamorphic stretch along 45°) are performed. In addition, the best fit coefficients for each eigenfunction transformation are determined by minimizing the mean-square error.

These plots depict the relative motion of pixels between two different images taken at different instances in time. The plots map the movement of the pixels to the ground. The length and direction of the vector arrows show the movement of pixels from one frame to another.

Figure 10:
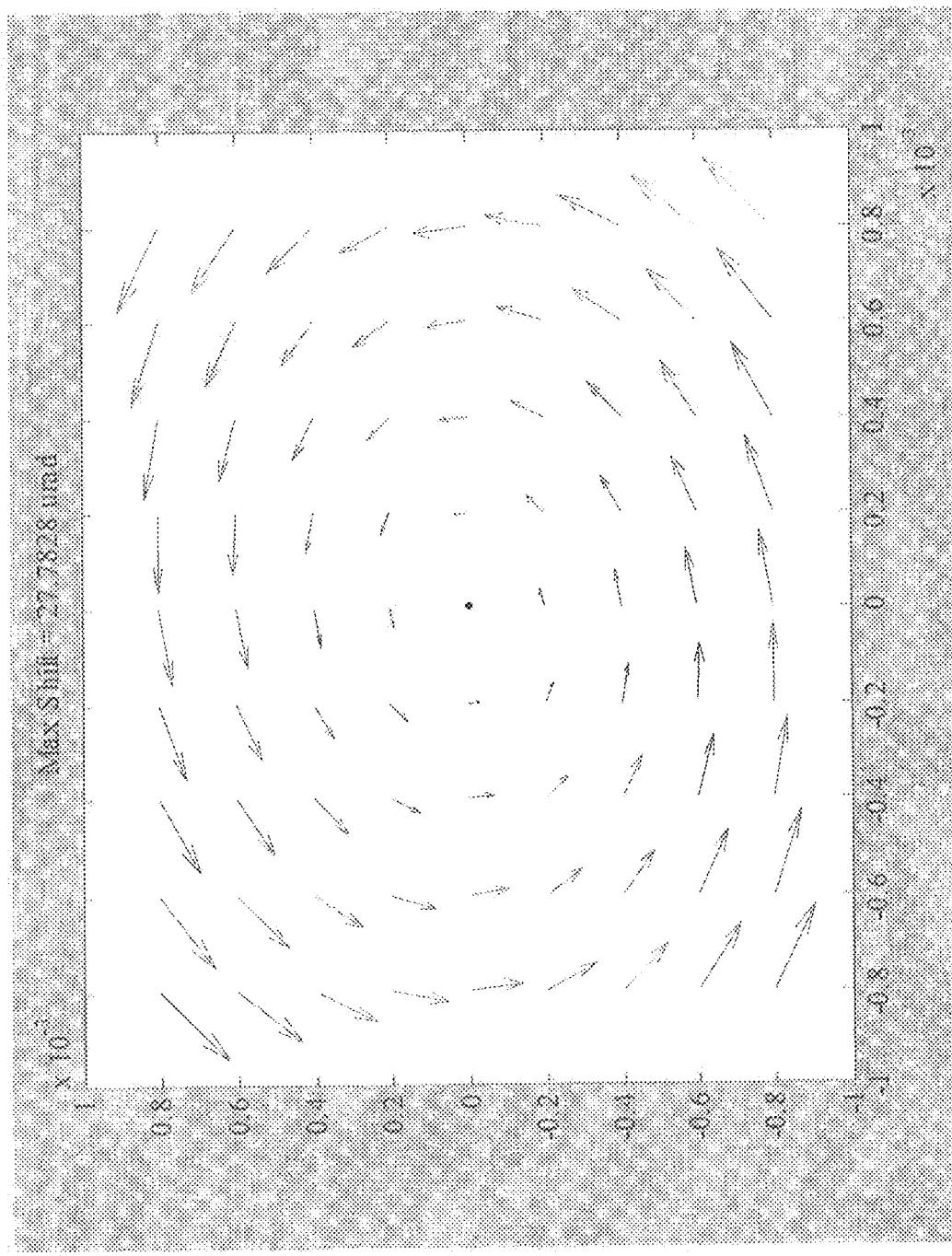
FIG. 10 shows a vector field of the overall image change of a scene viewed for one second over a field of view of 1.6 mrad from an altitude of 600 km.

FIG. 10, in particular, shows a vector field of the overall direction and magnitude of image change viewed by imaging platform 105 for one second over a field of view of 1.6 mrad (i.e., approximately one km) from an altitude of 600 km. FIG. 10 also shows that that the maximum image change is approximately 28 μrad per second.

Figure 11:
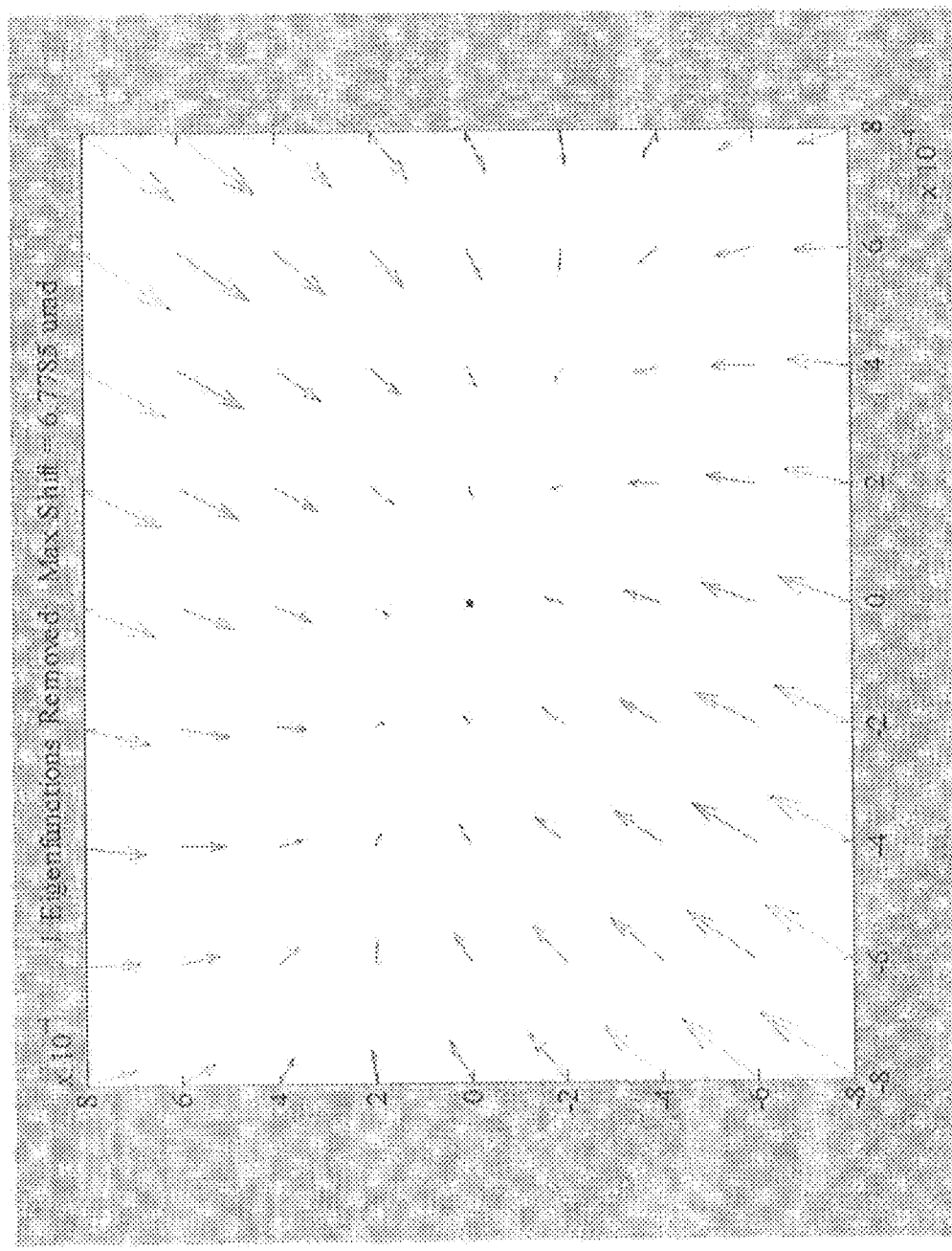
FIG. 11 shows the image changes remaining after correcting for rotation.

FIG. 11 shows the remaining image change after performing a rotational correction. Removing rotation alone reduces the maximum image change to approximately 6.8 μrad per second.

Figure 12:
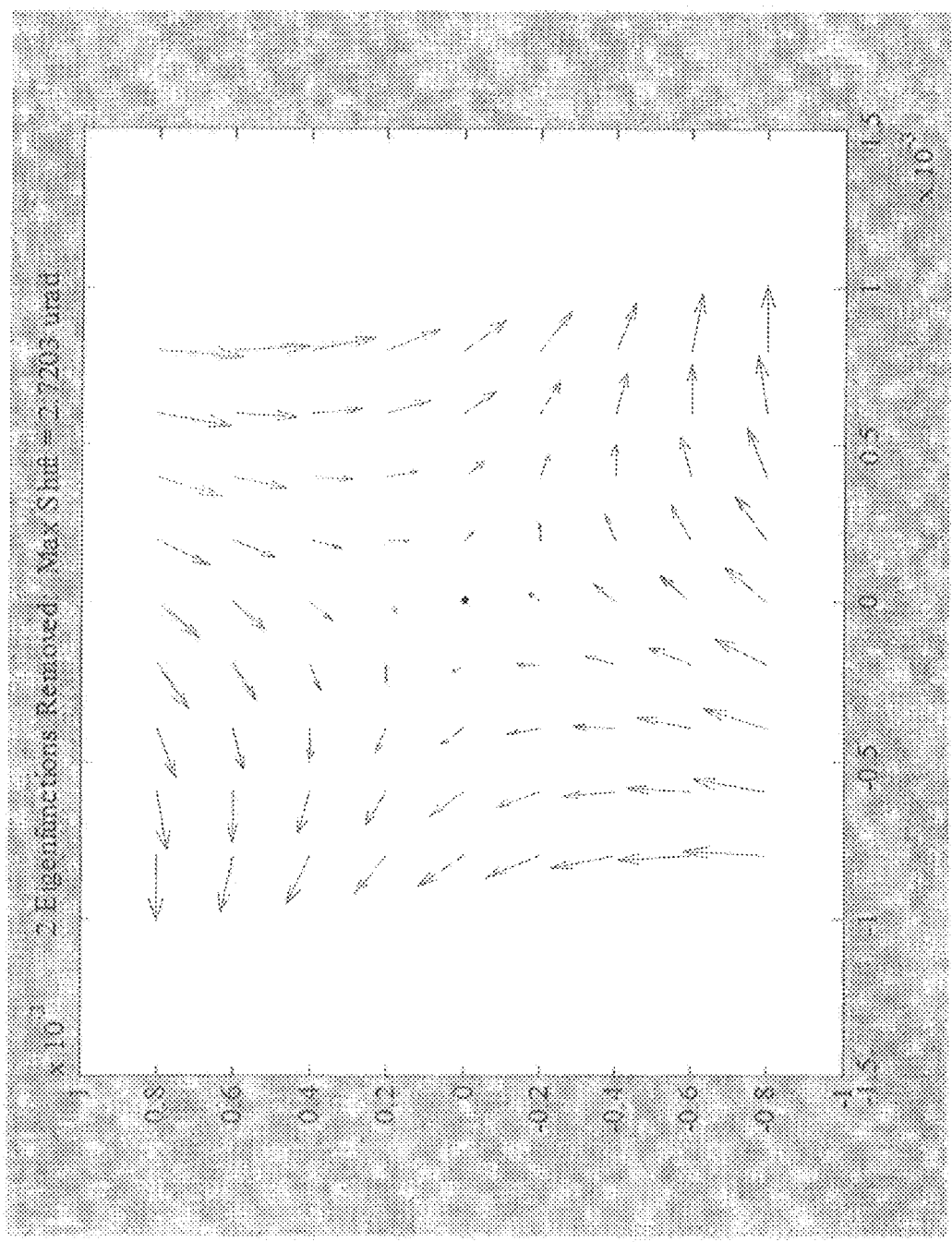
FIG. 12 shows the image changes remaining after correcting for zoom.

FIG. 12 shows the change remaining after correcting for rotation and zoom (focal length). Removing zoom, in addition to rotational image change, reduces the maximum image change to approximately 2.7 μrad per second.

Figure 13:
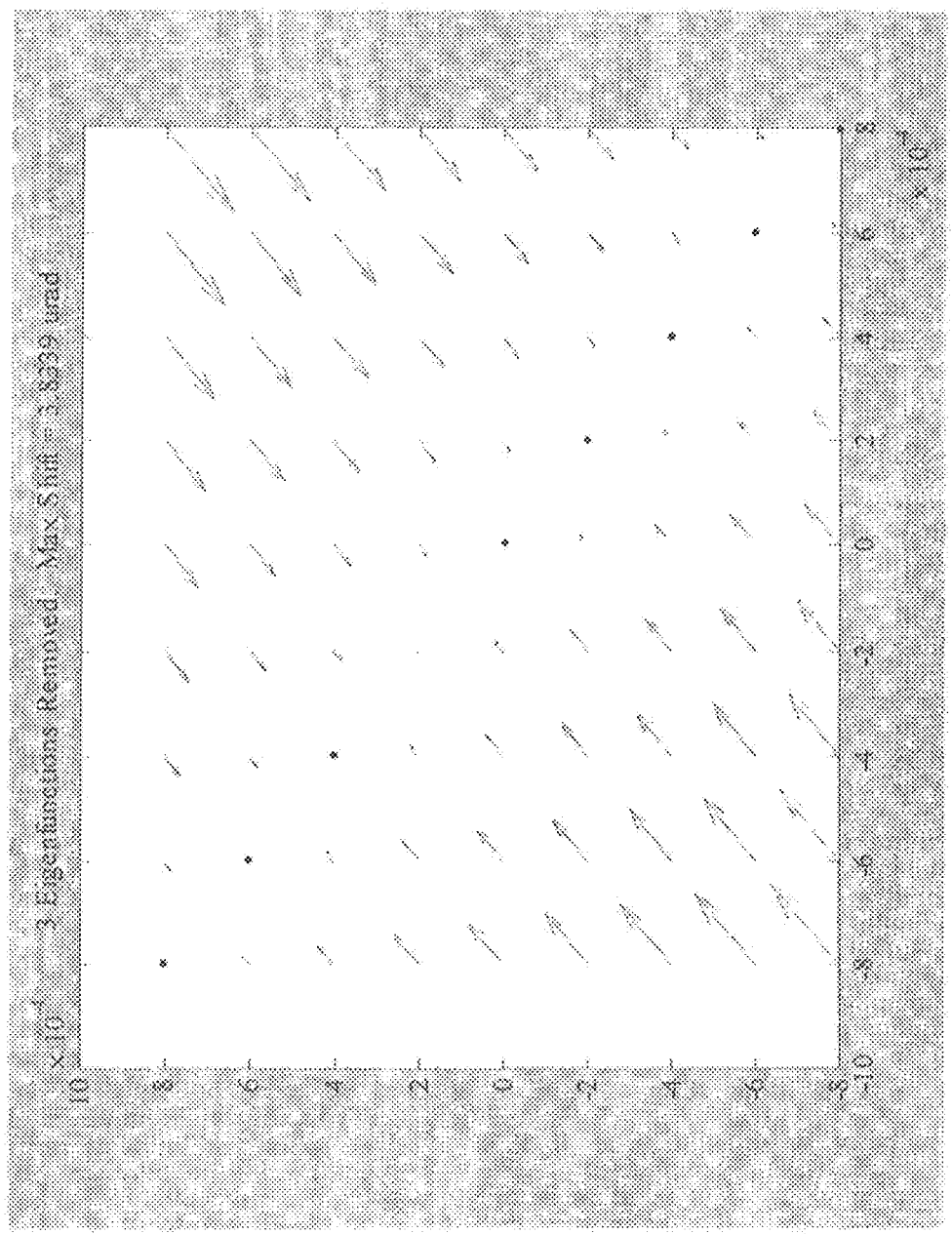
FIG. 13 shows the image changes remaining after correcting for anamorphic stretch along the x-axis.

FIG. 13 shows the change remaining after correcting for rotation, zoom and anamorphic stretch along the x-axis. Removing anamorphic stretch along the x-axis results in a maximum change of approximately 3.8 μrad per second.

Figure 14:
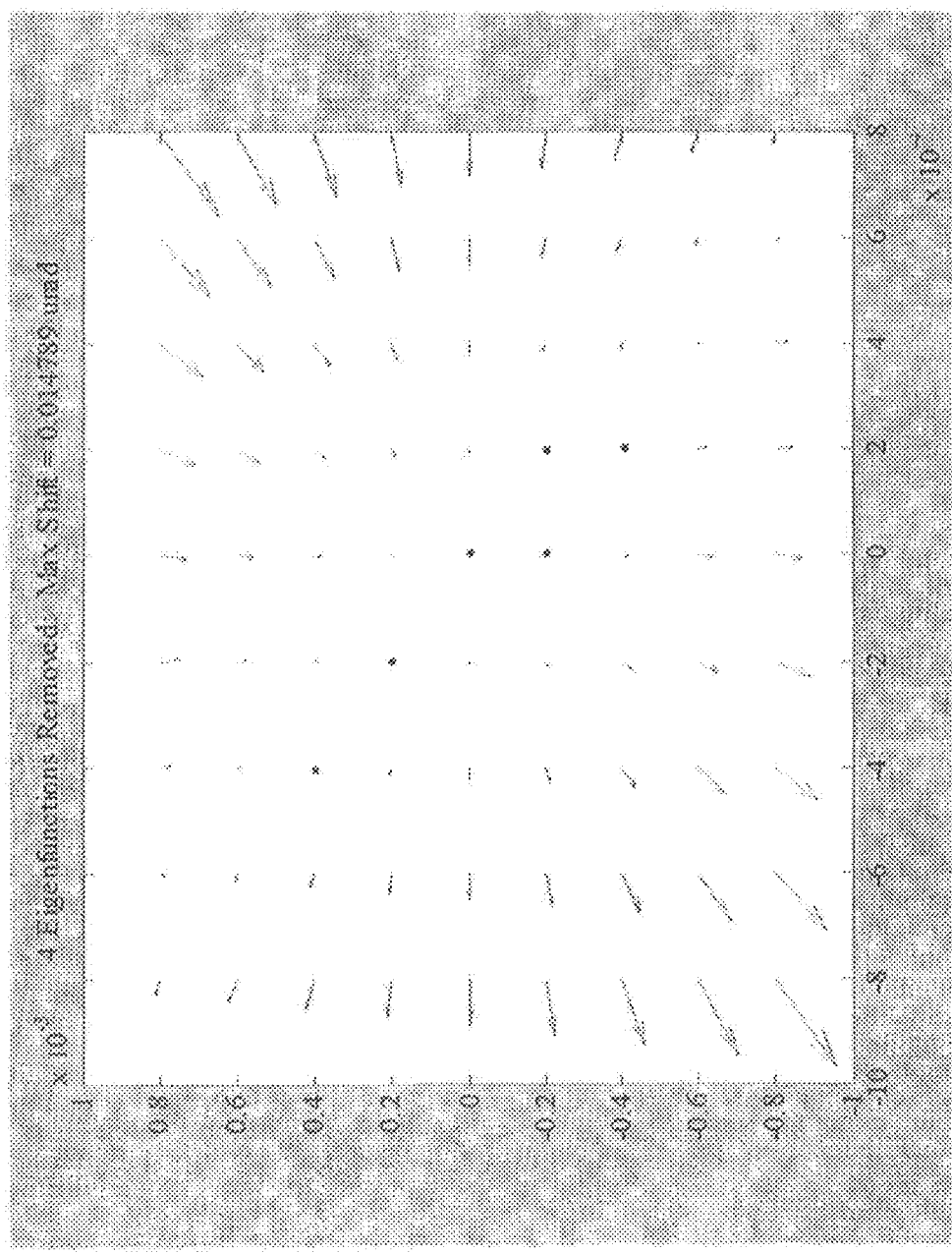
FIG. 14 shows the image changes remaining after correcting for anamorphic stretch at 45°.

FIG. 14 shows the image change remaining after correcting for correcting for rotation, zoom, anamorphic stretch along the x-axis and anamorphic stretch at 45°. Removing anamorphic stretch at 45° reduces the maximum change to approximately 0.015 μrad per second.

Figure 17:
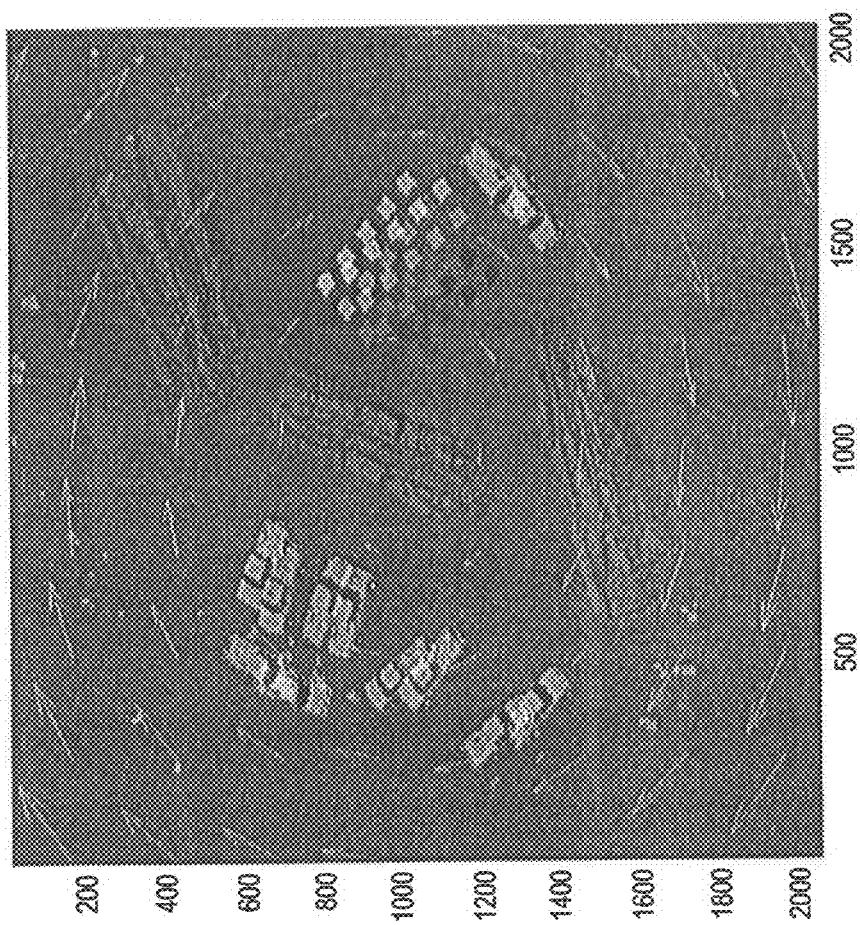
FIG. 17 shows a simulated frame of video data of an exemplary scene in a photon rich spectral band illustrating with arrow computed direction and magnitude changes between two frames at two instances.

According to various embodiments, the imaging platform or user may also select other combinations and sequences of the transformations described with respect to FIGS. 10-14. FIGS. 15A-15B and 16A-16B, respectively, show simulated imagery of photon weak (1.0-1.8 μm SWIR, primarily reflected energy) and photon rich (2.0-2.5 μm SWIR, primarily thermal energy) spectral bands before and after a typical image collection, under nighttime no moon illumination conditions. The blurring effect induced by platform motion on the resolution over the exposure time, as shown in FIGS. 15B and 16B, can clearly be seen. FIG. 17 illustrates arrows that show computed direction and magnitude of changes between the frames shown in FIGS. 16A-16B. Eigenfunction transformations based on these computations can be applied to the signal poor spectral band to obtain higher SNR imagery.

Figure 18A:
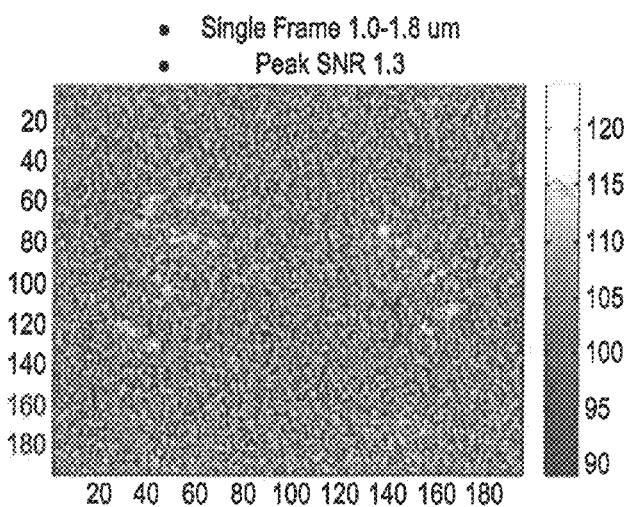
FIGS. 18A-18C show noisy and higher SNR image frames of a scene, achieved in accordance with an embodiment.
Figure 18B:
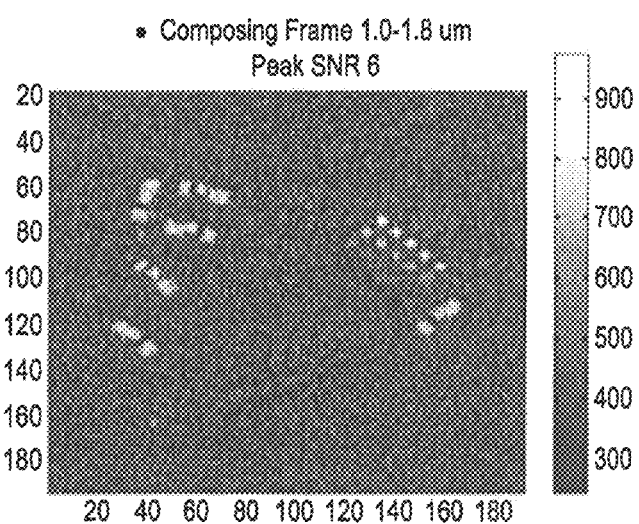
Figure 18C:
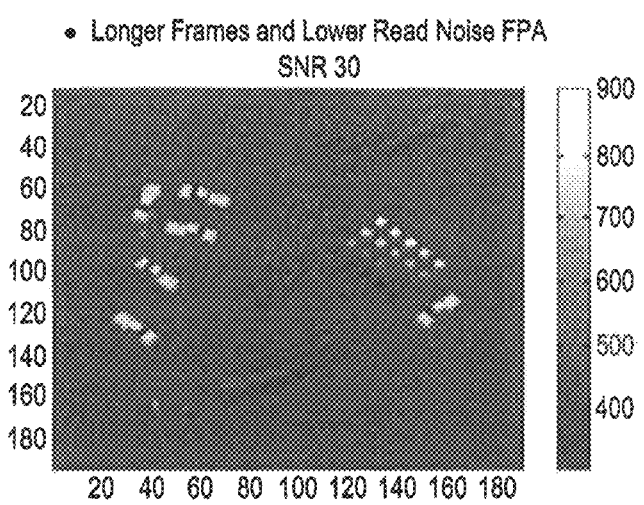
Figures 19C, 19D:

FIGS. 18A-18C illustrate an improved SNR obtained in a SWIR noisy SWIR image. FIG. 18A shows a single SWIR frame of a noisy scene having a peak SNR of 1.3. FIG. 18B shows a composite frame corrected in accordance with the described implementations that now exhibits a peak SNR of 6. FIG. 18C shows a further improvement to a SNR of 30 through use of longer frames and a lower read noise FPA.

FIGS. 19A-19D illustrate an advantage of the implementations, wherein SWIR and MWIR images of a scene before (19A, 19B) may be digitally corrected through eigenfunction transformation to produce images (19C, 19D) exhibiting greater resolution and the fusion of information (e.g., thermal) associated with only one of the spectral bands.

As used above, "comprise," "include," and/or plural forms of each are open ended and include the listed parts and can include additional parts that are not listed. "And/or" is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method for capturing images, the method comprising:
capturing, during an exposure period with at least one sensor on a moving imaging platform, frames of a scene in a first photon-rich spectral band and in a second photon-poor spectral band having a lower light level than the first photon-rich spectral band, the frames captured in the first photon-rich spectral band and the frames captured in the second photon-poor spectral band including identical image motion induced by a relative motion between the imaging platform and the scene, wherein the relative motion is unknown and not calculated;

calculating one or more transformations based on measured changes in inter-frame scenes captured in the first photon-rich spectral band to compensate for the induced image motion, wherein the induced image motion includes at least one of rotation, scale, and anamorphic stretch;

digitally transforming the captured frames of the second photon-poor spectral band with the one or more transformations compensating for the induced image motion in the frames captured in the second photon-poor spectral band to remove effects of the induced image motion; and summing a plurality of successive compensated frames captured in the second photon-poor spectral band to obtain higher signal to noise ratio (SNR) imagery in the second photon-poor spectral band compared to successive uncompensated frames captured in the second photon-poor spectral band, wherein capturing frames of the scene comprises interleaving first spectral band exposure times with second spectral band exposure times, the first spectral band exposure times being shorter than the second spectral band exposure times.

2. The method of claim 1, wherein the at least one sensor comprises a multi-band focal plane array (FPA).

3. The method of claim 1, further comprising:

identifying, in the frames captured in at least the first photon-rich spectral band, information representing one or more moving targets;

removing the identified information from the frames captured during the exposure period; and adding the information to at least one of the digitally transformed captured frames.

4. The method of claim 1, wherein:

capturing frames of the scene further comprises co-registering the frames captured in the first photon-rich spectral band and the second photon-poor spectral band; and the at least one sensor comprises a plurality of focal plane arrays (FPAs), each FPA in the plurality capturing frames in a distinct spectral band and having a known location relative to each other FPA in the plurality.

5. The method of claim 1, wherein the higher SNR imagery comprises a National Imagery Interpretability Rating Scales nighttime image.

6. The method of claim 1, wherein the first photon-rich spectral band includes an emissive band and the second photon-poor spectral band includes a reflective band.

7. The method of claim 1, wherein:

calculating the one or more transformations further comprises comparing successive frame images captured in the first photon-rich spectral band to compute gradients, and fitting the gradients to one or more image eigenfunctions in order to calculate one or more corresponding eigenfunction coefficients; and digitally transforming the captured frames comprises applying the one or more image eigenfunctions using the corresponding coefficients to the captured frames, and removing known imaging platform trajectory and sensor pointing motion effects from the captured frames.

8. The method of claim 7, wherein the image eigenfunctions include at least two of linear motion, rotation, scale, anamorphic stretch, skew and jitter.

9. A system configured to capture images, comprising:

a movable imaging platform configured with at least one sensor to capture, during an exposure period, frames of a scene in a first spectral band and in a second spectral band having a lower light level than the first spectral band, the frames captured in the first spectral band and the frames captured in the second spectral band including identical image motion induced by a relative motion between the imaging platform and the scene;

a transformation computation processor configured to calculate one or more eigenfunction coefficients based on a fitting of one or more image eigenfunctions to measured changes in inter-frame scenes captured in the first spectral band to compensate for the induced image motion; and an image correction processor configured to digitally transform the captured frames of the second spectral band with one or more eigenfunction transformations and the calculated one or more eigenfunction coefficients, in order to compensate for the image distortion resulting from the induced image motion, wherein the image distortion includes at least one of rotation, scale, and anamorphic stretch; and a fusion processor configured to sum a plurality of successive compensated frames captured in the second spectral band to obtain higher signal to noise ratio (SNR) imagery in the second spectral band compared to successive uncompensated frames captured in the second spectral band, wherein the at least one sensor captures frames of the scene in first spectral band exposure times interleaved with second spectral band exposure times, the first spectral band exposure times being shorter than the second spectral band exposure times.

10. The system of claim 9, wherein the at least one sensor comprises a multi-band focal plane array (FPA).

11. The system of claim 9, further comprising a mover processor configured to:

identify in the frames captured in the first spectral band information representing one or more moving targets;

remove the identified information from the frames captured during the exposure period; and optionally add the information to at least one of the digitally transformed captured frames.

12. The system of claim 9, wherein:

the at least one sensor comprises a plurality of FPAs, each FPA in the plurality capturing frames in a distinct spectral band and having a known location relative to each other FPA in the plurality; and the moving imaging platform includes a registration processor configured to co-register the frames captured in the first spectral band and the second spectral band.

13. The system of claim 9, wherein the higher SNR imagery comprises a NIIRS nighttime image.

14. The system of claim 9, wherein the at least first spectral band includes an emissive band and the at least second spectral band includes a reflective band (SWIR).

15. The system of claim 9, wherein:

the transformation computation processor is further configured to calculate the one or more eigenfunction coefficients by comparing successive frame images captured in the first spectral band to compute gradients, and fitting the gradients to one or more image eigenfunctions in order to estimate the induced motion and pointing error; and the image correction processor is further configured to apply the one or more image eigenfunctions and eigenfunction coefficients to the captured frames of the second spectral band, and removing known imaging platform trajectory and sensor pointing motion effects from the captured frames of the second spectral band.

16. The system of claim 15, wherein the image eigenfunctions include at least one of linear motion, rotation, scale, anamorphic stretch, skew and jitter.

* * * * *